United States Patent
Liu et al.

(10) Patent No.: US 9,621,967 B2
(45) Date of Patent: Apr. 11, 2017

(54) METHODS AND SYSTEMS FOR PASSIVE OPTICAL SWITCHING

(71) Applicant: VISCORE TECHNOLOGIES INC., Kanata (CA)

(72) Inventors: Yunqu Liu, Kanata (CA); Kin-Wai Leong, Ottawa (CA); Wenda Ni, Ottawa (CA); Changcheng Huang, Ottawa (CA)

(73) Assignee: VISCORE TECHNOLOGIES, Kanata (CA)

( * ) Notice: Subject to any disclaimer, the term of this patent is extended or adjusted under 35 U.S.C. 154(b) by 0 days.

(21) Appl. No.: 14/647,195

(22) PCT Filed: Nov. 26, 2013

(86) PCT No.: PCT/CA2013/000976
§ 371 (c)(1),
(2) Date: May 26, 2015

(87) PCT Pub. No.: WO2014/078940
PCT Pub. Date: May 30, 2014

(65) Prior Publication Data
US 2015/0296278 A1 Oct. 15, 2015

Related U.S. Application Data

(60) Provisional application No. 61/729,872, filed on Nov. 26, 2012.

(51) Int. Cl.
*H04B 10/00* (2013.01)
*H04Q 11/00* (2006.01)
(Continued)

(52) U.S. Cl.
CPC ......... *H04Q 11/0005* (2013.01); *H04B 10/27* (2013.01); *H04J 14/0267* (2013.01);
(Continued)

(58) Field of Classification Search
CPC .......................... H04B 10/27; H04J 14/0267
See application file for complete search history.

(56) References Cited

U.S. PATENT DOCUMENTS 5,633,961 A * 5/1997 Kirkby ............... G02B 6/12004
385/16
2008/0031624 A1* 2/2008 Smith .................. H04B 10/071
398/71
(Continued)

*Primary Examiner* — Danny Leung
(74) *Attorney, Agent, or Firm* — The Law Office of Michael E. Kondoudis

(57) ABSTRACT

Optical networking has become ubiquitous in providing low cost, high speed communications networks supporting our communication needs from FTTH through long haul to undersea. The large number of users and high speeds provided to each user fiber mean that information retrieval and routing functionality within the data centers hosting this information can become the bottleneck both in terms of speed and latency. According to embodiments of the invention the inventors present architectures based upon all-optical passive optical networks that support a distributive approach to latency reduction as well as protocols relating to their deployment. Beneficially, such POCXN concepts exploit optical components already supported by high volume manufacturing techniques as well as CWDM/DWDM techniques for throughput increase.

12 Claims, 12 Drawing Sheets

(51) Int. Cl.
*H04J 14/02* (2006.01)
*H04B 10/27* (2013.01)
*G02B 6/35* (2006.01)

(52) U.S. Cl.
CPC ....... *H04Q 11/0062* (2013.01); *G02B 6/3546* (2013.01); *H04Q 2011/0015* (2013.01); *H04Q 2011/0056* (2013.01); *H04Q 2011/0064* (2013.01); *H04Q 2213/1301* (2013.01)

(56) References Cited

U.S. PATENT DOCUMENTS

| | | | |
|---|---|---|---|
| 2009/0190921 A1* | 7/2009 | Nakajima | G01M 11/3136 398/13 |
| 2012/0039598 A1* | 2/2012 | Dahlfort | H04B 10/071 398/13 |
| 2014/0126900 A1* | 5/2014 | Urban | G01M 11/3145 398/13 |
| 2015/0296278 A1* | 10/2015 | Liu | H04J 14/0267 398/50 |
| 2015/0304052 A1* | 10/2015 | Schemmann | H04B 10/572 398/68 |

\* cited by examiner

METHODS AND SYSTEMS FOR PASSIVE OPTICAL SWITCHING

CROSS-REFERENCE TO RELATED APPLICATIONS

This patent application claims the benefit of U.S. Provisional Patent Application 61/729,872 filed Nov. 26, 2012 entitled "Methods and Devices for Passive Optical Switching", the entire contents of this patent application being included by reference.

FIELD OF THE INVENTION

The present invention relates to optical networks and more particularly to passive optical cross-connection networks for latency reduction.

BACKGROUND OF THE INVENTION

In recent years, we have been witnessed a rapid advancement of the optical access and local area networks driven by ever growing bandwidth demand, and fundamental inability of the competing technologies, e.g. those based on twisted copper, coaxial cable or wireless transmission, to deliver. Accordingly, transmission over optical fiber has emerged as a universal means for communications, from long-haul to metropolitan area to broadband access networks, resulting in an explosion of optical Internet and convergence of different media streams (e.g. data, voice, and video) into Internet Protocol data delivered in the optical domain right to the end user. Within optical access optical fiber provides a future proof solution to the "last mile" bottleneck, which not only dramatically increases the network capacity, but also eliminates costly transitions from optical into electrical domain (and vice versa). Within local area, metropolitan area, and wide area networks (LAN, MAN, and WAN) optical fiber similarly provides scalable networks exploiting the same wavelength division multiplexing (WDM) techniques atop time division multiplexing at 2.5 Gb/s and 10 Gb/s (OC-48/OC-192) as long-haul networks with 4, 8, 16, 32, 48, or 64 wavelengths for example although expansion by discrete wavelengths is possible.

Such networks exploit a variety of architectures including, but not limited to, point-to-point, linear (also referred to as bus), ring, star, tree and mesh as well as unidirectional traffic per fiber (multiple fibers) and bidirectional traffic per fiber as well as TDM, Coarse WDM (CWDM), and Dense WDM (DWDM) techniques. Linear networks are typically employed in long-haul networks as are mesh networks and the associated fully-connected networks. Ring networks typically appear in LANs, MANs, WANs and tree networks are exploited in fiber-to-the-home/curb/premises (FTTH/FTTC/FTTP) etc (commonly generalized to FTTx). These logical classifications of network topologies describe the path that the data takes between nodes being used as opposed to the actual physical connections between nodes. Logical topologies are often closely associated with Media Access Control (MAC) methods and protocols which in most instances can also be dynamically reconfigured by exploiting routers and/or switches.

These optical networks form therefore the network fabric that provides consumers today with high speed Internet access, on-demand audiovisual content distribution, unlimited simple message service (SMS), etc such that wireless and wired electronic devices for communications, entertainment, and commercial applications have become essentially ubiquitous. As a result of all the stored content terms such as "server farms" and "data centers" have become part of the language representing locations where not tens but hundreds and thousands of computer servers and storage drives (hard drives) are co-located to support the storage and distribution of data on the Internet. "Server farms" and "data centers" exploiting optical networks internally are part of what are now referred to as Enterprise Optical Networks which exploit in addition to other elements Network-Attached Storage (NAS) and Storage Area Networks (SANs) designed to the demands of the application and not generalized computing applications. A NAS device is a server dedicated to nothing more than file sharing and which allows more hard disk storage space to be added to a network that already utilizes servers without shutting them down for maintenance and upgrades. With a NAS device, storage is not an integral part of the server, but rather the server handles all of the processing of data which one or more NAS devices deliver to it and to the user. A NAS device does not need to be located within the server but can exist anywhere in a network, typically a LAN, and can itself be made up of multiple networked NAS devices. A SAN is a high-speed sub-network of shared storage devices where each storage device contains nothing but a disk or disks for storing data. Ideally, a SAN's architecture should make all storage devices available to all servers on the network it is connected to.

With an estimated 100 billion plus web pages on over 100 million websites, data centers contain a lot of data. With almost two billion users accessing all these websites, including a growing amount of high bandwidth video, it's easy to understand but hard to comprehend how much data is being uploaded and downloaded every second on the Internet. At present the compound annual growth rate (CAGR) for global IP traffic between users is between 40% based upon Cisco's analysis (see http://www.cisco.com/en/US/solutions/collateral/ns341/ns525/ns537/ns705/ns827/white_paper_c11-481360_ns827_Networking_Solutions_White_Paper.html) and 50% based upon the University of Minnesota's Minnesota Internet Traffic Studies (MINTS) analysis. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will occur between users flow via data centers or users accessing content in data centers and accordingly between data centers and within data centers these IP traffic flows must be multiplied many times to establish the true total IP traffic flows. Data centers are filled with tall racks of electronics surrounded by cable racks where data is typically stored on big, fast hard drives and computer servers take requests and move the data using, today, fast electrical switches to access the right hard drives. At the periphery of these data centers routers connect the computer servers to the Internet. At the same time as these increasing demands evolving applications such as cloud computing are increasing where computing platforms are no longer stand alone systems but homogenous interconnected computing infrastructures hosted in massive data centers known as warehouse scale computers (WSC) which provide ubiquitous interconnected platforms as a shared resource for many distributed services with requirements that are different to the traditional racks/servers of data centers. As if this was not hard enough evolving business practices, business models, and user expectations for continual price erosion, if not elimination, in the cost per bit transferred and/or stored.

Accordingly, there is a drive for cost-effective yet scalable ways of interconnecting data centers and WSCs internally and to each other so that they and the telecommunication networks can meet the challenge of exponentially increasing demands for bandwidth and speed without dramatically increasing the cost and power of the infrastructure. At the same time expectations of low or no latency in accessing content provide additional pressure. Accordingly data center interconnections, wherein for simplicity we encompass WSCs, NAS, San, server farms as well as traditional data centers within the term data center, have become a critical element in the overall performance of the Internet and the myriad of commercial, financial, and personal applications exploiting it. Fiber optic technologies already play critical roles in data center operations and will increasingly as the goal is to move data as fast as possible, with the lowest latency, with the lowest cost, with the lowest power consumption, and the smallest space consumption. Accordingly, Gigabit Ethernet is too slow and whilst 10 Gb/s solutions such as Ethernet, Fiber Channel, and Intel's LightPeak for example are deployed they are limited. Already Fiber Channel is moving to 16/20 Gb/s and Ethernet is headed for 40 Gb/s and 100 Gb/s. At 40 Gb/s and 100 Gb/s the existing and emerging standards call for multiple 10 Gb/s channels run over parallel multimode optical fiber cables or wavelength division multiplexed (WDM) onto a singlemode fiber. The multimode optical fiber links typically require 8 fibers for 40 Gb/s, represent 4×10 Gb/s in each direction, and 20 fibers for 100 Gb/s, representing 10×10 Gb/s in each direction. With respect to standards then these define a 100 m/150 m reach for 100 GBASE-SR10 links exploiting OM3/OM4 multimode optical fibers respectively. In contrast a 10 km reach is defined for 100 GBASE-LR4 Single Mode Fiber (SMF) links as well as other telecom legacy solutions such as the 10×10 G MSA. The 10×10 G MSA also includes proposed standards for 40 km links.

However, whilst data transmission speeds are increasing such that a given block of information is transmitted within a shorter period of time these evolving systems do not address latency, the time between a request for data being made and the data being provided, nor network failures that can increase latency. Typically, these optical networks either exploit an architecture such as linear, bus, or ring wherein the latency between any two nodes on the network is dependent upon both their distances from the network access points and the relative location of these network access points on the network or a star network wherein latency is driven by their distances from the core and the ability of the central switching fabric to route the data from one "arm" of the network to another. Whilst speed, cost, and some latency have been addressed by exploiting fiber optic links for the "arms" of the network the central switching fabric remains exploiting large electronic cross-connects in order to handle the link capacity.

Optical switching fabrics have to date been primarily focused to space switching applications, e.g. protection, fail-over, and reconfigurable add-drop multiplexers, with switching speeds of the order of milliseconds rather than the nanoseconds and picoseconds necessary to provide switching at the level of frames or other blocks within the data. Whilst, optical switch designs for operation at these timescales exist, e.g. lithium niobate, gallium arsenide, and indium phosphide based photonic circuits, the costs, performance, and scalability of these have limited their deployment in anything other than demonstrations and experimental test-beds. However, it would be evident that latency can be reduced if the data from one node was distributed to all nodes simultaneously rather than being routed through a ring, linear, bus, mesh network or core electronic router.

According to embodiments of the invention the inventors present architectures based upon all-optical passive optical networks, which they refer to as passive optical cross-connection networks (POCXN), that support such a distributive approach to latency reduction as well as protocols relating to their deployment. Beneficially, such POCXN concepts exploit optical components already supported by high volume manufacturing techniques.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address issues within the prior art relating to optical networks and more particularly to providing passive optical cross-connection networks for latency reduction.

In accordance with an embodiment of the invention there is provided a device comprising:
- a plurality of distribution stages, each stage comprising a predetermined number of passive optical splitters comprising input ports and output ports which couple optical signals at each of the input ports to all of the output ports simultaneously; and
- a plurality of interconnection stages, each interconnection stage connecting a first predetermined stage of the plurality of stages to a second predetermined stage of the plurality of stages such that a predetermined portion of the optical signals from the outputs of a first predetermined number of passive optical splitters of the first predetermined stage of the plurality of stages are coupled to a predetermined portion of the inputs of a second predetermined number of passive optical splitters of the second predetermined stage of the plurality of stages in a predetermined manner.

In accordance with an embodiment of the invention there is provided a method comprising:
- providing a passive optical cross-connection network (POXN) comprising a first plurality of input ports and a second plurality of output ports;
- providing a plurality of nodes coupled to the POXN such that signals transmitted from a node of the plurality of nodes are distributed automatically to the plurality of nodes absent any switching function;
- providing a protocol engine in execution upon each node, the protocol engine executing a periodically repeating process of a single node discovery sequence and at least one data transfer sequence;
- wherein the transmitted data from each node during the at least one data transfer sequence is determined in dependence upon the number of nodes requesting during the node discovery sequence to transmit data and the amount of data each node requesting to transmit has to transmit.

completed by inserting independent claims when agreed)
In accordance with an embodiment of the invention there is provided a method comprising:
- providing a passive optical cross-connection network (POXN) comprising a first plurality of input ports and a second plurality of output ports;

providing a plurality of transmitter nodes coupled to the POXN such that signals transmitted from a transmitter node of the transmitter plurality of nodes are distributed automatically to a plurality of receiver nodes absent any switching function, each transmitter node transmitting on a predetermined wavelength;

providing the plurality of receiver nodes coupled to the POXN such that signals transmitted from the plurality of transmitter nodes are distributed automatically to the plurality of receiver nodes absent any switching function, each receiver node receiving the signals from all transmitting transmitter nodes of the plurality of transmitter nodes;

providing a plurality of electronic processing elements receiving the plurality of received signals from the plurality of transmitter nodes, each electronic processing element filtering from each received signal of the plurality of received signals all content not intended for the receiver node of the plurality of receiver nodes of which the electronic processing element is associated; and providing a plurality of buffers, each buffer receiving the filtered received signals from the plurality of transmitter nodes and sequencing the filtered received signals for transmission to a data sink connected to the buffer.

In accordance with an embodiment of the invention there is provided a method comprising:

providing a first passive optical cross-connection network (POXN) comprising a first plurality of first input ports and a second plurality of first output ports;

providing a second passive optical cross-connection network (POXN) comprising a first plurality of second input ports and a second plurality of second output ports; and providing a plurality of data sources, each data source coupled to a predetermined first input of the first plurality of first input ports, a predetermined first output of the first plurality of first output ports, a predetermined second input of the second plurality of second input ports, a predetermined second output of the second plurality of second output ports.

In accordance with an embodiment of the invention there is provided a method comprising:

providing a plurality N of passive optical cross-connection networks (POXN), each POXN comprising a plurality of input ports and a plurality of output ports; and providing a plurality of data sources, each data source coupled to a predetermined input of each POXN of the plurality of POXNs and to a predetermined output of each POXN of the plurality of POXNs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to optical networks and more particularly to passive optical cross-connection networks for latency reduction.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

Figure 1A:
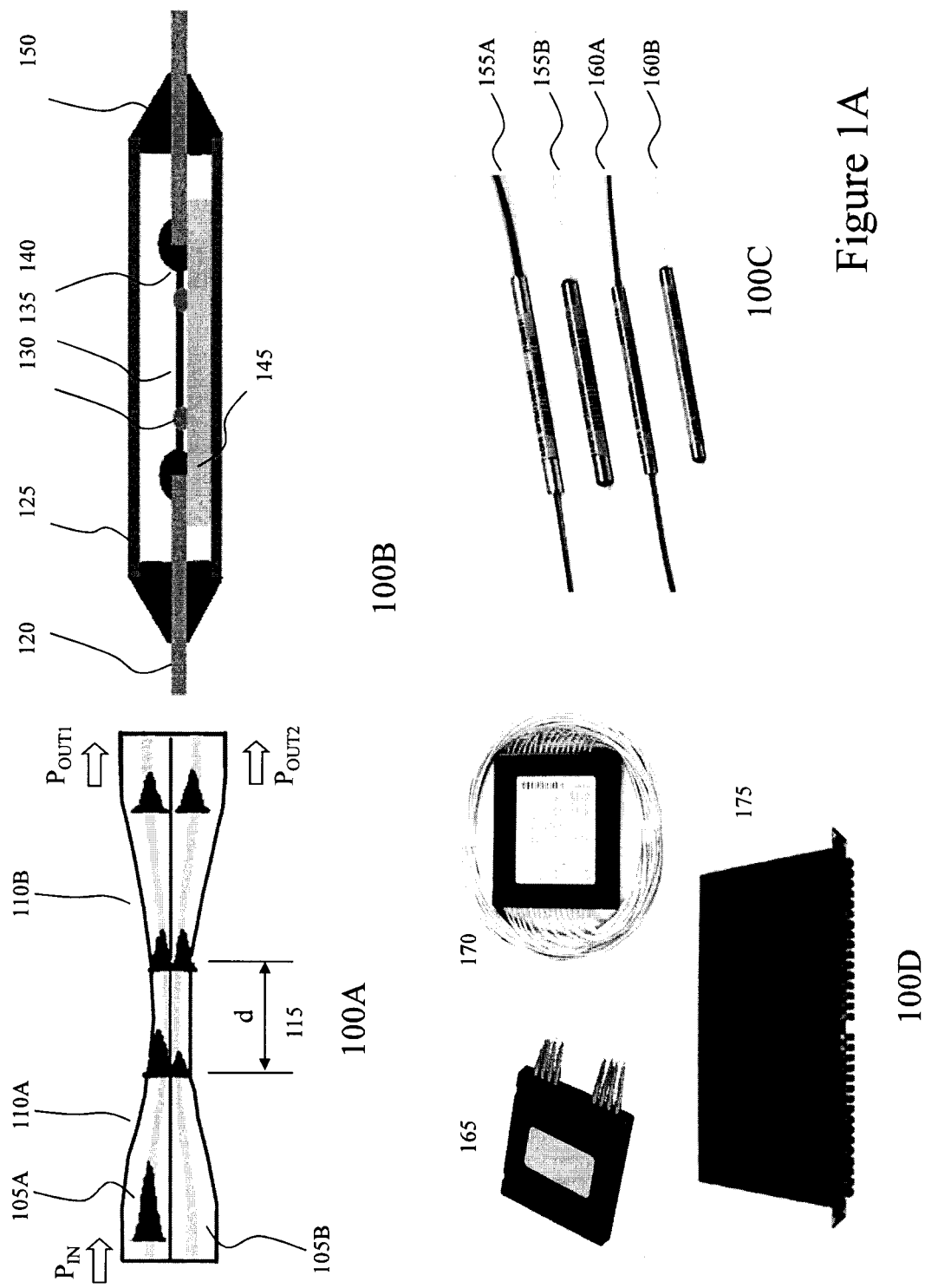
FIGS. 1A and 1B depict fused fiber passive optical power splitters/combiners according to the prior art.

Passive Optical Cross-Connects:

Referring to FIG. 1A there are depicted first and second views 100A and 100B of fused fiber passive optical power splitters/combiners according to the prior art. Referring to first view 100A a fused 2×2 coupler is depicted wherein first and second optical fibers 105A and 105B respectively have been pulled and twisted together within a zone with a flame applied for example such that the optical fibers soften and can be drawn such that their cores and cladding reduce increasing the coupling from one fiber to another within the central tapered region 115 of length d. Also depicted are first and second tapers 110A and 110B where the optical fibers taper to/from their initial geometry, e.g. 9 μm core and 125 μm cladding to the central tapered region 115. As a result the optical signals within one optical fiber, e.g. first optical fiber 105A, are distributed between the two outputs with powers $P_{OUT1}$ and $P_{OUT2}$ according to the tapering process and its termination. As such $0 \leq P_{OUT1} \leq P_{IN}$ and $P_{OUT2}=P_{IN}-P_{OUT1}$ such that a variety of split ratios may be implemented, for example 10:90, 25:75, 50:50 etc. Typically in forming a star coupler 50:50 couplers are employed.

The resulting fused fiber coupler is fragile and hence is typically assembled in a protective housing, such as illustrated in second view 100B. Here the fused coupler 135 has been mounted to a quartz substrate 145 with epoxy 130. The optical fibers, typically with the primary 250 μm coating are within tubing 120 which are similarly attached each end to the quartz substrate 145. This assembly is then inserted typically into a metal tube 125 and retaining boots 150 attached to seal the ends of the metal tube 125 and hold the tubing 120. Examples of such packaging being depicted by first and second assembled splitters 155A and 155B in third view 100C which employ 900 μm secondary tube and 250 μm primary coating respectively with a package of diameter 5.6 mm and length 76 mm together with third and fourth assembled splitters 160A and 160B in third view 100C similarly employing 900 μm secondary tube and 250 μm primary coating respectively with a package diameter of 4 mm. In an effort to reduce footprint for such couplers some suppliers, e.g. Viscore, offer fused fiber packaging of diameter 3.0 mm and lengths of 54 mm or 60 mm. Also depicted in FIG. 1 in fourth view 100D are first to third star couplers 165, 170 and 175 respectively representing 4×4 module, 16×16 module and 32×32 rack mount star couplers respectively.

Figure 1B:
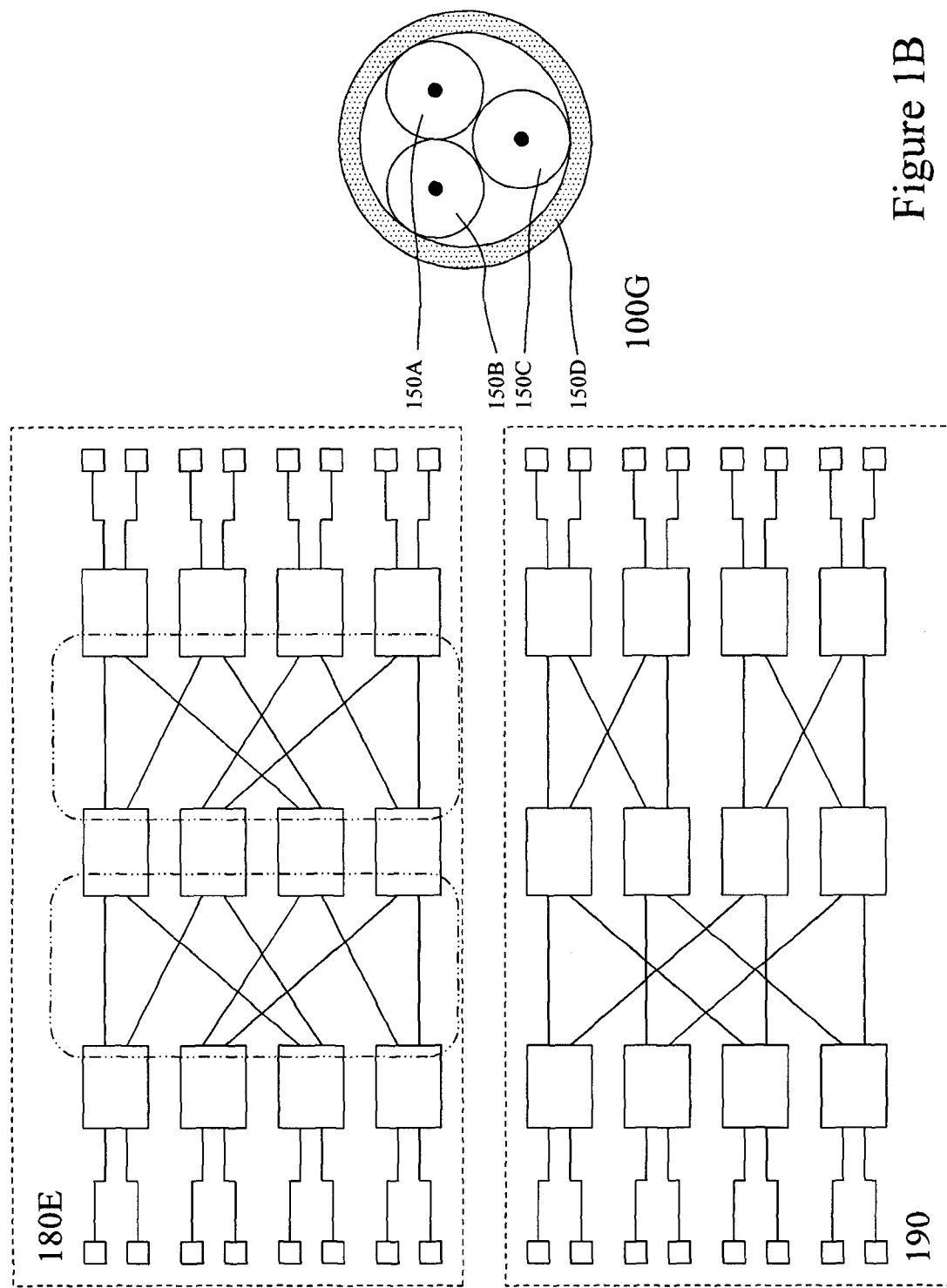

Referring to FIG. 1B there are depicted first and second networks 180 and 190 respectively which represent so-called "perfect shuffle" and Banyan architectures for implementing star couplers with $M=2^n$ where n=2, 3, 4, . . . , etc for 4×4, 8×8, 16×16, etc star couplers according to the prior art. First network 100E implementing the "perfect shuffle" exploits n=3 banks of R=M/2 2×2 couplers where between each pair of banks a "perfect shuffle" is implemented. In contrast second network 190 similarly employs 3 banks of R=M/2 2×2 couplers but now the shuffles between the first and second banks of 2×2 couplers and the second and third banks of 2×2 couplers are different. Within the first and second banks of 2×2 couplers the shuffle routes is divided such that the top half of the first bank couples to all couplers and the bottom half of the first bank similarly couples to all couplers but between the second and third banks of 2×2 couplers the shuffle is split such that the top half of the shuffle only couples to the top half and the lower half similarly only couples to the lower half. With extensions of the star coupler design according to the Banyan architecture depicted in second network 190 each rank l=1, 2, . . . , n from the couples between $X=2^{n-1}$ couplers as subsets within the R=M/2 2×2 couplers. As such a 32×32 coupler the ranks are couple between 16, 8, 4, and 2 groups of 2×2 couplers in each rank.

Accordingly, it would be evident that the complexity of such star couplers presents a significant issue as arrays of fused fiber couplers must be connected together with a defined sequence of where each optical fiber must route. This leads to large devices, e.g. rack mounted 32×32 star coupler presented as third star coupler 175 in FIG. 1A. Further, with increasing M the insertion increases by 3 dB (passive splitting loss) plus the excess loss of the fused fiber 2×2 coupler (typically 0.4 dB for high quality fused couplers in volume) and interconnection loss (typically 0.1 dB) for each additional rank of 2×2 couplers.

Accordingly, considering a requirement for a 27×27 star coupler then the required number of ranks is n=5, i.e. M=32, as the previous rank, i.e. n=4 supports up to 16 ports. Accordingly the insertion loss for a perfect splitter with n=5 would be Loss=3 dB×n=3 dB×5=15 dB and for a typical assembled splitter Loss=3.5 dB×5=17.5 dB. It would therefore be beneficial to provide an approach to implementing star couplers with fused fiber devices that reduced the number of devices and insertion loss as the number of ports increases. The inventors have therefore analysed star coupler assemblies using Z×Z couplers wherein Z=2, 3, 4, . . . . A 1×3 coupler cross-section being depicted in first view 100G in FIG. 1B. Some couplers, such as the 1×3, provide a highly symmetric structure for fusing that provides improved uniformity as opposed to others such as 1×4 for example.

It would be evident to one skilled in the art that beneficially the latency of a star coupler, from each input port to any output port is effectively constant unlike the node to node latency in ring, bus, and mesh type architectures for example. Considering a system with no active device involved in the optical fabric, i.e. optical amplification to provide signal amplification or regeneration is not available in the optical domain, and then the power budget becomes the deciding factor in port density of the coupler fabric. To calculate the power budget for the coupler fabric, we first need to estimate the power loss from the remainder of the system, which mainly includes multiplexer/de-multiplexer insertion loss and fiber transmission loss. Specifically, power loss caused by a multiplexer/de-multiplexer is around 2.5 dB for a CWDM based on thin-film filters. The link budget for each fiber segment between a multiplexer/de-multiplexer and the coupler fabric is 3 dB, assuming a loss of 0.3 dB/km and a length of 10 km, which is typically the maximum reach requirement within a data center. In most cross-connect applications the fiber length would be much shorter than 10 km. At the system level, an optical signal from a transmitter to a receiver travels through one multiplexer, one de-multiplexer, and maximally therefore 20 km length of fiber, causing a power loss of 11 dB. Given a system power budget of 35 dB, which is feasible with the existing optical device technology, then the power budget for the coupler fabric is 24 dB.

Figure 2:
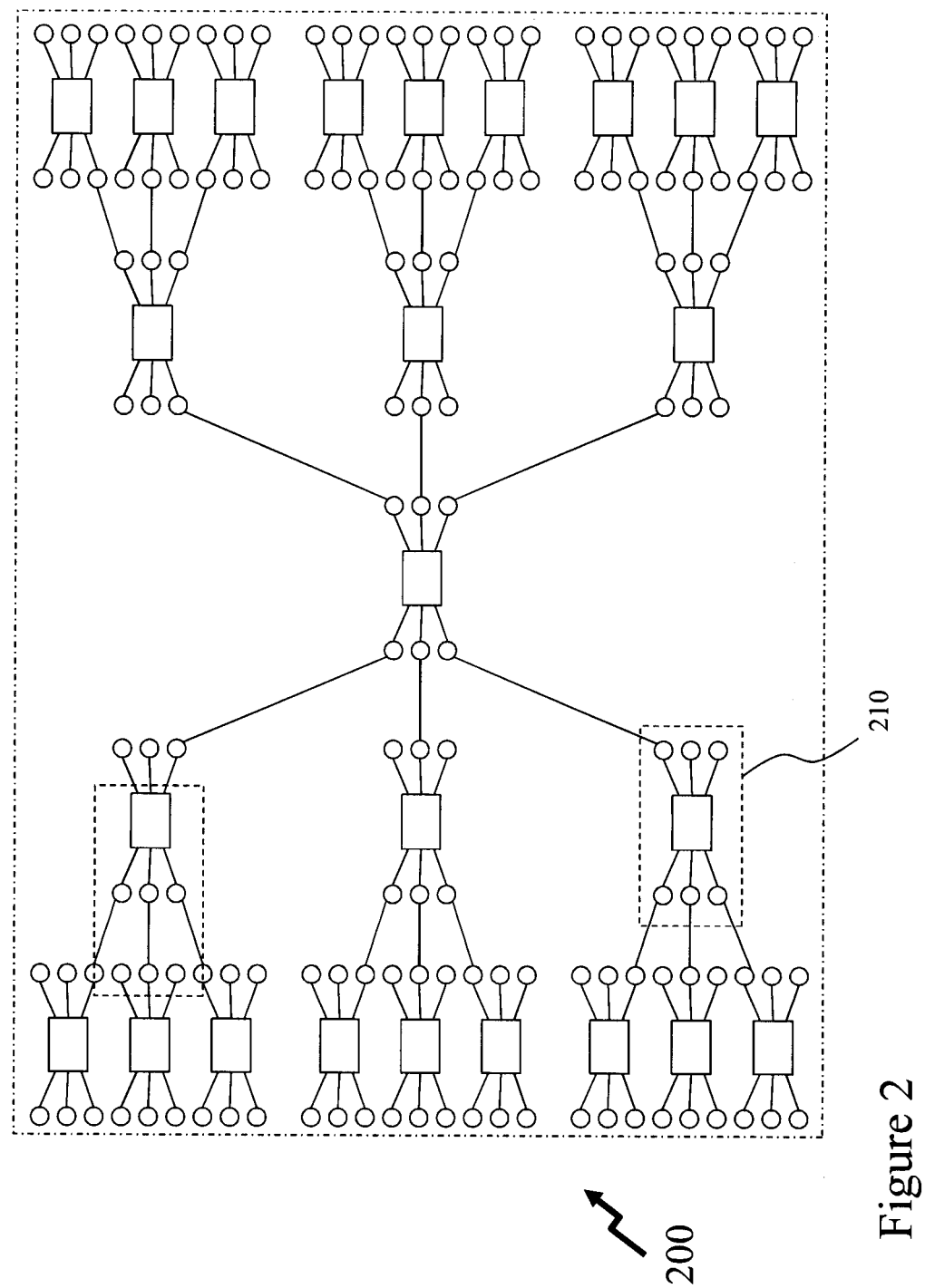
FIG. 2 depicts an exemplary architecture for a 27×27 star coupler according to an embodiment of the invention.

The inventors have also established designs for star couplers with high channel port counts that exploit a combination of fused fiber coupler designs, such as 2×2 and 3×3 couplers, to provide the required design. Referring to FIG. 2 there is depicted an exemplary architecture 200 for a 27×27 star coupler according to an embodiment of the invention exploiting 3×3 couplers 210 in tree configurations. Each 3×3 coupler 210 has an intrinsic loss of 4.77 dB and can be manufactured, in volume, with 0.5 dB excess loss based on existing fused fiber technology. As depicted in FIG. 2 the architecture 200 initially combines all the input signals into one single 3×3 coupler 210 and then split the signal power equally among all the outputs, again using 3×3 couplers 210. For N inputs and N outputs, such a design requires 2[log 3N]−1 stages of 3×3 couplers 210. Considering the splice loss for interconnecting adjacent stages to be 0.2 dB with the 0.5 dB excess loss then the power loss at each output is 5.47(2[log 3N]−1)−0.2 dB. Consequently, for a 24 dB power budget, between a transmitter and receiver, then port count N can only go up to 9 before this loss is exceeded. The problem with this design is that two-thirds of the power is completely wasted during each combining or splitting operation.

Figure 3:
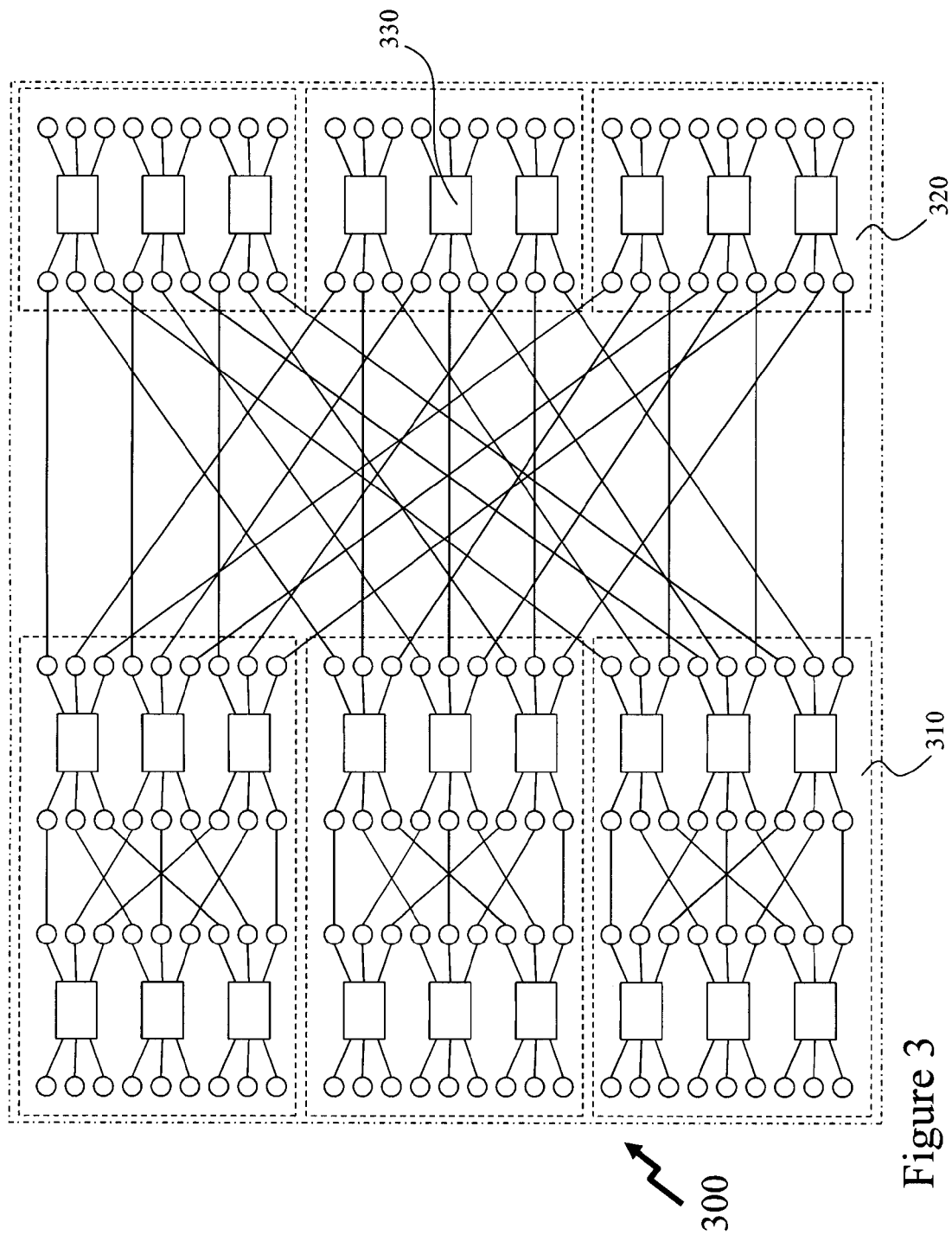
FIG. 3 depicts an exemplary architecture for a 27×27 star coupler according to an embodiment of the invention.

Similarly, referring to FIG. 3 there is depicted an exemplary architecture 300 for a 27×27 star coupler according to an embodiment of the invention exploiting 3×3 couplers 330 in a modified Banyan configuration employing first sub-blocks 310 providing 9×9 star couplers in conjunction with second sub-blocks 320 employing 3 3×3 couplers 330. Architecture 300 provides a more efficient design is to interconnect 3×3 couplers 330 using a Banyan or baseline topology so that all the input power is delivered to the outputs with equal power splitting. Compared with the previous design in FIG. 2, the number of stages within exemplary architect 300 is reduced from 5 to 3. More generally, for N inputs and N outputs, only [log 3N] stages of 3×3 couplers 330 corresponding to a power loss of 5.47[log 3N]−0.2 dB at any output. With the 24 dB power budget, port count of a coupler fabric can scale up to N=81. The power loss at each output under this scenario is 21.68 dB. Note that if 3.01 dB 2×2 couplers with the same excess loss are used to construct a coupler fabric, the port count of the coupler fabric can go up to N=64, with the exact power loss to be 22.06 dB at an output.

Figure 4:
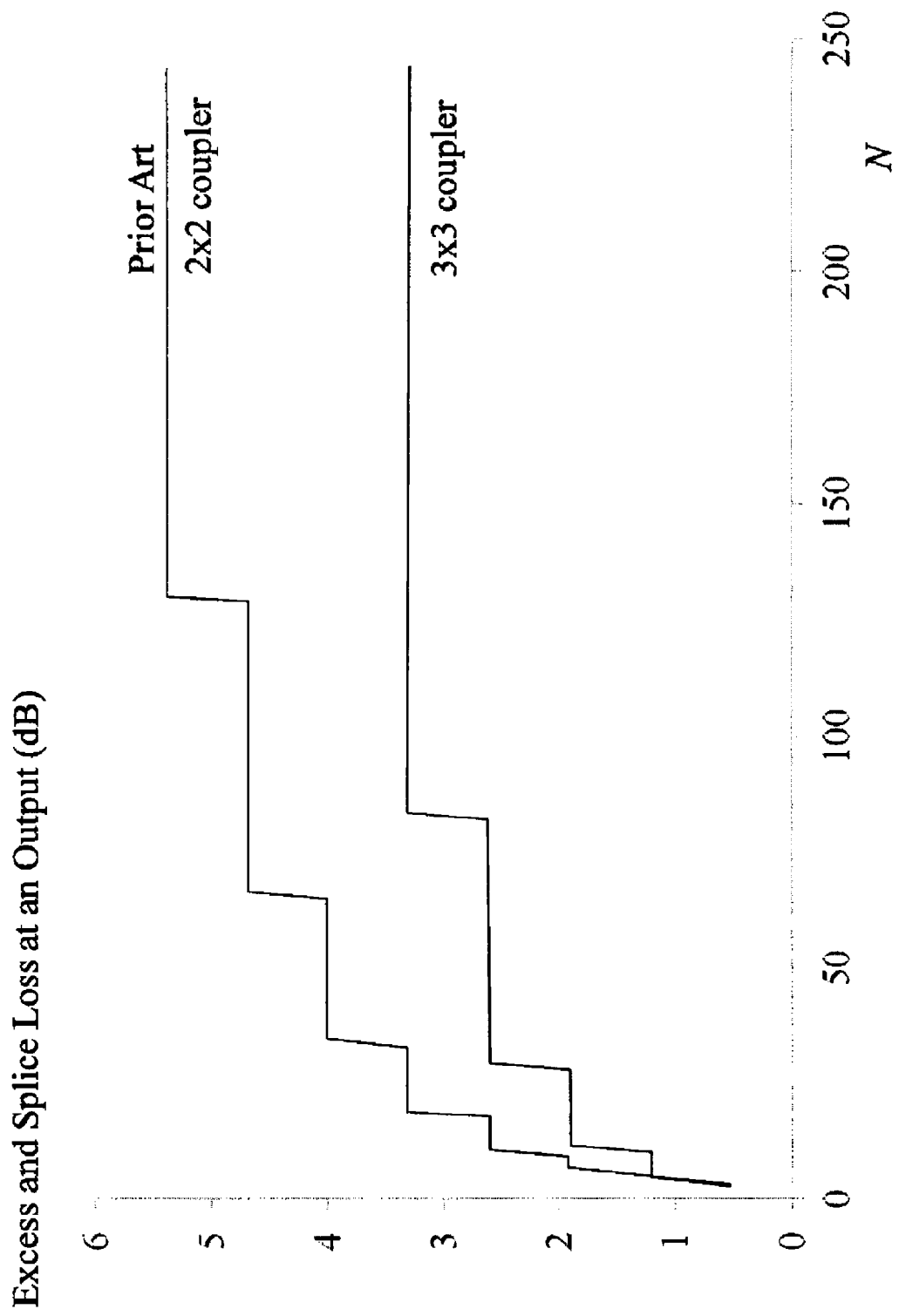
FIG. 4 depicts the excess optical loss with port count for star couplers according to the prior art and embodiments of the invention.

The power loss at an output consists of the fundamental loss caused by power split, and additional loss introduced by coupler excess loss and fiber splice loss. The contribution of additional loss is 0.7[log 3N]−0.2 dB and 0.7[log 2N]−0.2 dB for using 3×3 and 2×2 optical couplers, respectively. Referring to FIG. 4 these excess losses are plotted wherein it is evident that the 3×3 couplers are better building blocks than 2×2 couplers from the excess and splice loss viewpoint. Accordingly, based upon the analysis performed by the inventors they have shown that star couplers offer improved performance when assembled with fused devices other than the prior art construction methodology based upon 2×2 fused fiber couplers. According, considering 3×3 building blocks then the port counts with increasing n are 3, 9, 27, 81, and 243 in contrast to 2, 4, 8, 16, and 32 for prior art designs. However, the inventors have also analysed hybrid star coupler designs exploiting both 3×3 couplers in combination with 2×2 couplers allowing intermediate port counts to be implemented wherein the port count supported, N, can be any integer number with and only with prime factors of 3 and/or 2, e.g. N=48).

It would be evident to one skilled in the art that beneficially the latency of a star coupler, from each input port to any output port, such as depicted in FIGS. 3 and 4 by exemplary architectures 300 and 400 respectively is effectively constant unlike the node to node latency in ring, bus, and mesh type architectures for example.

It would be evident that a variety of other architectures may be employed exploiting varying combinations of small Z×Z couplers, e.g. 2×2, and 3×3, in order to provide the desired star coupler functionality. It would also be evident that other small Z×Z couplers may be employed if these can be manufactured with high performance including for example 4×4, 6×6 etc. Further some architectures may exploit small M×N couplers such as 3×1, 4×2 for example. Whilst the architectures presented and discussed supra in respect of star couplers and small Z×Z couplers have been discussed in respect of exploiting fused fiber device technologies it would be evident to one skilled in the art that alternatively exploit free space or other optical waveguide technologies either to provide the whole star coupler fabric or connecting the small Z×Z coupler building blocks. Free space techniques in conjunction with micro-optic Z×Z couplers allow, as with optical fiber, low loss cross-overs between different paths with no interference (cross-talk). Further, some POXN architectures may be "folded" using reflective structures such that that the transmitter and receiver ports of a node may be coupled to the same side of the POXN rather than all transmitters ports of the nodes to one side and all receiver ports of the nodes to the other side. With appropriate additional optics at each node then the transmit/receive channels may be bidirectionally transmitted on a single optical fiber rather than a pair of optical fibers.

Optionally, a variety of folded fully connected networks, including, but not limited to, Banyan, Butterfly, and Perfect Shuffle, may be employed to provide the optical coupler fabric in part or in whole. Within other embodiments of the invention one or more diffraction gratings may be employed as part of a free space optical hybrid version to provide the splitting function. In other embodiments of the invention the grating may be configurable allowing for a reconfigurable fabric to be implemented. Further in other variants of the invention hybrid free-space optical couplers may be provided as a building block, e.g. 4×4, 6×6, for use within POXNs according to embodiments of the invention. In some folded POXN elements using diffraction gratings a portion of these gratings may be replaced by wavelength selective switches (WSS).

A star coupler as discussed above is a passive distribution device allowing the construction of optical cross-connection networks within a data center. Accordingly, a key optical device used for such cross-connection is an N times N wavelength-independent coupler fabric, which has N inputs and N outputs. Optical power from each input is equally divided among the N outputs so that no reconfiguration is needed to set up a circuit between any input and any output and the latency between any input and any output within the optical cross-connection network. This enables passive optical cross-connects to support various types of traffic. However, reduced bandwidth efficiency may initially be considered to occur as spatial wavelength reuse is not possible among the different input-output pairs as may be employed within an actively switched cross-connection. However, to fully appreciate the bandwidth benefits of optical technology, wavelength-division multiplexing (WDM) is employed at each input of the coupler fabric. Within this analysis, driven by data centre deployment sensitivity to cost concerns, CWDM is advocated in the current design. With current CWDM technology, each wavelength may operate at 10 Gb/s, and each port may support 18 wavelengths. Accordingly, in this scenario the total bandwidth capacity of the optical cross-connection network is 180 Gb/s. Moreover, time-division multiplexing (TDM) may be employed on each wavelength to improve the bandwidth utilization at sub-wavelength granularity as evident from the analysis below. In other embodiments of the invention, with limitations established from link length, cost, etc each wavelength may operate at increased datarates, e.g. 20 Gb/s, 40 Gb/s etc, whilst the number of wavelengths may be increased to 44 wavelengths at 100 GHz using DWDM within the C-band (1528.77 nm to 1563.86 nm) or high using interleavers as well as exploiting S-band and L-band extensions in the 1550 nm region.

Figure 5:
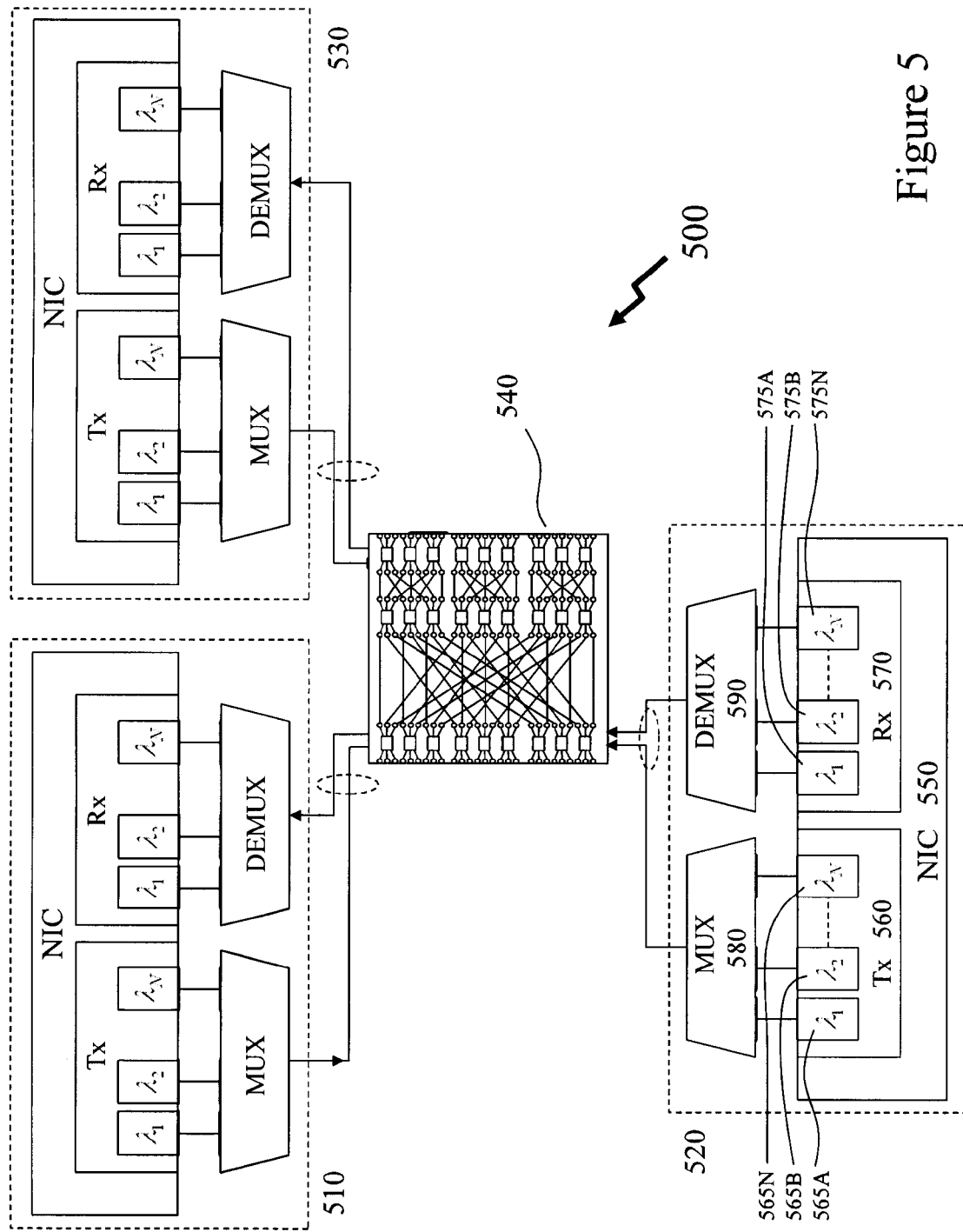
FIG. 5 depicts an exemplary WDM based link topology in conjunction with a star coupler according to an embodiment of the invention.

Referring to FIG. 5 there is depicted a transmission system 500 employing a cross-connected fabric with first to third nodes 510, 520, and 530 respectively representing the M nodes coupled to the 2M×2M coupler fabric 540. Within the remainder of this specification such cross-connected fabrics are referred to as Passive Optical Cross-Connect (POXC) fabrics. Within each of the first to third nodes 510, 520, and 530 respectively a network interface card (NIC) 550 has a transmitting port and a receiving port. Each transmitting port, being the output of the multiplexer 580, is equipped with an array of fixed (or tunable) transmitters within the transmitter block 560 all working at different wavelengths, represented by first to N transmitters 565A through 565N. These different wavelengths are carried on different fibers initially wherein all the wavelength signals are then combined into one fiber through the multiplexer 550. The receiving port is the reverse of the transmitting port, capable of receiving all of the N wavelengths. The receiving port has a similar structure as its transmitting counterpart, where the multiplexer 580 and the transmitter block 560 are replaced by a de-multiplexer 590 and a receiver block 570, respectively. The receiver block 560 comprises first to N receivers 575A through 575N To enable accurate clock synchronization and delay measurement, we assume that transmitters and receivers with one NIC 550 have the same fiber distance to the coupler fabric so that propagation delay from a source NIC 550 to a destination NIC 550 is the same as that from the destination back to the source. This assumption is typically satisfied in real systems.

Passive Optical Cross-Connect Protocol:

It would be evident to one skilled in the art that a POXC fabric, due to its broadcast property, means that bandwidth resources are shared among all inputs. Accordingly, in order to avoid frame collisions from different input ports at an output port it is essential to develop a multiple access protocol that coordinates port transmissions at the link layer. Within the description supra an 18 wavelength 10 Gb/s CWDM deployment was considered providing a total bandwidth capacity of 180 Gb/s. Ideally, a multiple access protocol should enable an average transmission rate of 180/N Gb/s per port for the N inputs, if all N inputs have data to send, and an instantaneous transmission rate of 180 Gb/s if only one port has data to send. However, control overhead is unavoidable, leading to reduced transmission rate in either case.

The inventors have proposed a highly distributed protocol with Quality of Service (QoS) support by taking advantage of the peer nature of the ports and the broadcast nature of the medium. The protocol, referred to as the High-Efficiency Distributed Access Protocol (HEDAP), can achieve an efficiency above that of the polling approach for a master-slave infrastructure while maintaining a fully distributed operation to avoid single point of failure. HEDAP is divided into two phases: a discovery phase and a data transmission phase. The discovery phase is designed to achieve plug-and-play objective that will minimize the operation cost of the network. During this phase, ports in a POXN will have a chance to discover other ports in the POXN, establish a common reference clock, synchronize clocks to the reference clock, and measure round-trip and loopback times. The discovery phase is shown schematically in FIG. 6 by discovery sequence 610 and is followed by a plurality of data transfer sequences 650 which each occur within a scheduling cycle 640. Details of the discovery phase are presented below.

Figure 7:
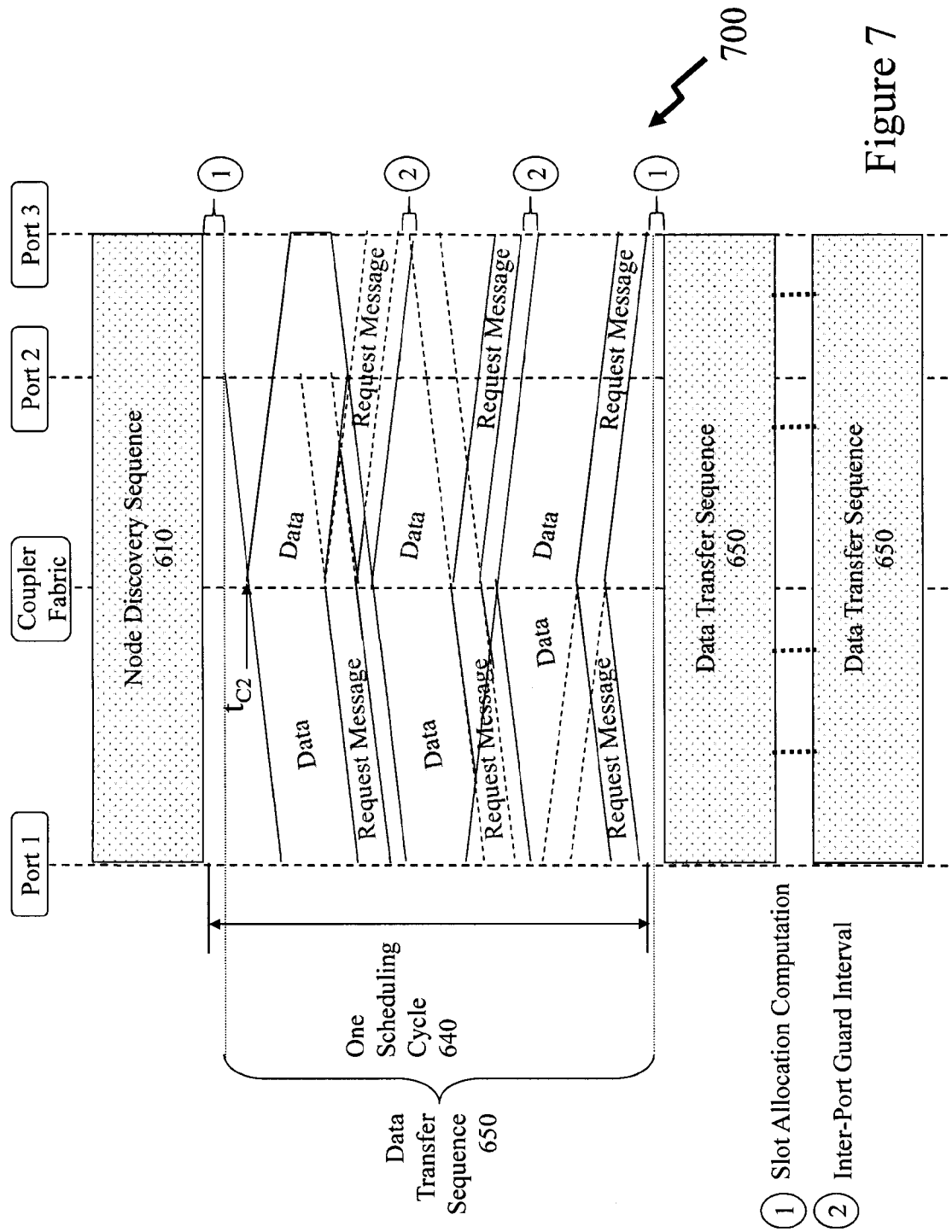
FIG. 7 depicts a data transfer sequence as part of a network protocol employing a star coupler according to an embodiment of the invention.

The data transfer phase, depicted in FIG. 7, follows the discovery phase, but takes a longer time to complete than the discovery phase so that the overhead introduced by the discovery phase can be minimized. The data transfer phase is further divided into multiple scheduling cycles 640, each including a data transfer phase 650, after the discovery sequence 610. Each port that has been discovered in the discovery phase will have a chance to send a burst of frames within each scheduling cycle. At the end of the burst, the port also advertises the amount of traffic it needs to send during the next cycle. This piggyback approach will allow all other ports to learn of this request through the broadcast-based POXN while minimizing the bandwidth waste for maintaining inter-port guard intervals between traffic bursts from different source ports. Different from the polling approach, where a master node polls slave nodes, makes a schedule based on the responses, and then notifies slave nodes of their schedules, ports in a POXN can make their own schedules individually and locally after learning all the advertisements from other ports. As long as a common scheduling algorithm is used by all ports, scheduling conflictions can be avoided. This is similar to the approach used by peer-to-peer networks, where a common hashing function is used by all peers to build a distributed hashing table (DHT) without the need of a centralized server. With the measured loopback times in the discovery phase, clock drifts and propagation delays can be compensated so that schedules from different ports can be fully aligned in time within a cycle. Because there is no need for the polling message as in the polling approach, the cycles can follow one after another with very little gap. This further reduces the overhead associated with the polling approach.

To accommodate port churns, the inventors allow the discovery phase to repeat after the data transfer phase has been running for long enough time. The repeats of the discovery phase will allow new ports to be discovered, clock re-referenced and resynchronized (in face of clock-reference port failure), and round-trip and loopback times measured again (in face of clock-reference port failure). The period between discovery phases should be long enough to accommodate as many scheduling cycles as possible while be short enough to minimize the delay of a new port joining the network and the impact of clock drifts. The protocol can be implemented as a single instance to manage multiple wavelengths as logically one block of resource, or multiple independent instances, one for each wavelength, to achieve better manageability, flexibility and reliability. Both implementation modes have the same bandwidth efficiency. The following description describes these phases with reference to FIGS. 6 and 7 respective.

Discovery Phase: Discovery Phase at System Boot

When the system boots, all ports start by listening to the POXN for a predetermined period of time. Based on the fact that no transmission is detected within this period, each port knows that the system has just booted. Then, all ports start sending DISCOVERY messages after their random back-off periods to allow themselves to be identified by all the other ports while minimizing message collisions. A DISCOVERY message carries MAC address of the sender port, a timestamp at which the message is transmitted, the time period for the discovery window, and the amount of traffic to be sent in the first scheduling cycle. Whilst transmitting, a port also listens for DISCOVERY messages at its receiving side. These messages will include the one sent by itself. Without transmission coordination, message collisions are likely to occur. Collided messages are detected at the MAC layer of a port's receiving side. Similar technique has been used in EPON (IEEE Standard 802.3-2008). Persistent collisions are avoided by imposing a random back-off before each DISCOVERY message is sent. The discovery window starts with the correct reception of the first DISCOVERY message by all ports, and lasts as specified in that message.

Figure 6:
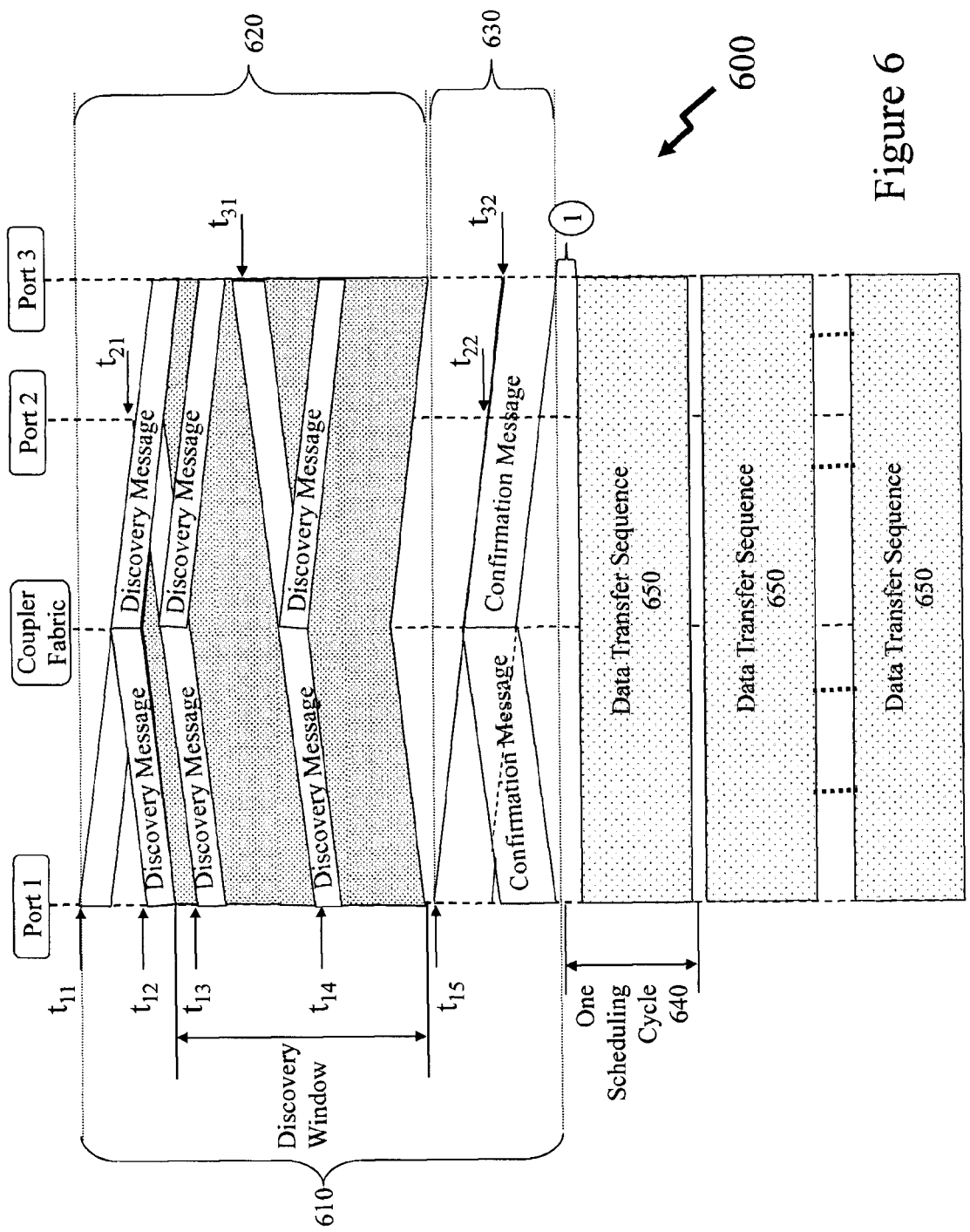
FIG. 6 depicts a discovery sequence as part of a network protocol employing a star coupler according to an embodiment of the invention.

Since each port hears exactly the same message flow from the channel, a port can safely infer that the first DISCOVERY message successfully received at its local receivers is also the first DISCOVERY message successfully received by all the other ports so that the discovery window is globally agreed upon. If multiple wavelengths are managed by one single protocol instance, messages on different wavelengths may be received at the same time. In this case, the same tiebreak policy is used by all ports to select the same first message. All DISCOVERY messages must be received within the discovery window by any port. Due to the propagation delay from port to port, the actual window allowed for transmitting DISCOVERY messages, denoted by $t_{TW}$, is smaller than the announced discovery window $t_{TW}$. Since port-to-port propagation delays are unknown at this point, the worse-case propagation delay $T^{PP}_{MAX}=100\mu.s$, which is over the maximum fiber distance of 20 km, is assumed to approximate a safe transmission window. We have $t_{LW}=t_{DW}-T^{PP}_{MAX}$. If any message collision is detected within $t_{TW}$ (may or may not be its own DISCOVERY message), a port will schedule a retransmission after a new random backoff period until either its own DISCOVERY message is properly received at its local receivers (and thus by all the other ports), or the transmission window $t_{TW}$ is over. The successful reception of a DISCOVERY message indicates the sender port to be known by all the ports. We call such a port to be a successful port. The first successful port decides the discovery window, and its clock also serves as the reference clock for synchronization. In FIG. 6, we assume that Port 1 is the first successful port, and Ports 2 and 3 follow. Port 1 can then decide its loopback time as $T_{L1}=t_{12}-t_{11}$. Similarly, Ports 2 and 3 can decide their corresponding loopback times $T_{L2}$ and $T_{L3}$, respectively. After the time period of the discovery window as announced by the first successful port expires, no other ports are allowed to send anything.

The first port will then broadcast a CONFIRMATION message to summarize each known port with information such as the MAC address of the port, the transmission time of the DISCOVERY message from the port (i.e., the timestamp within the DISCOVERY message), the reception time of the DISCOVERY message at the first port, and the traffic request for the first scheduling cycle. The CONFIRMATION message also announces the starting time $t_{C1}$ of the subsequent data transmission phase, the total number of scheduling cycles contained, and the size of the discovery window for the next discovery phase. Each port can then use the information to decide the round-trip time to the first port and its clock offset from the reference clock of the first port. Take Port 2 for example. Let $t^{12}_{rtt}$ and $t_{offset}$ denote its round-trip time to Port 1 and its clock offset from Port 1, respectively. It is easy to establish that $t_{13}=t_{21}-t_{offset}+\frac{1}{2} t^{12}_{M}$, and $t_{22}=t_{15}+t_{offset}+\frac{1}{2} t^{12}_{rtt}$. Thus, we have $t^{12}_{rtt}=(t_{22}-t_{15})+\left(t_{13}-t_{21}\right)$, and $t_{offset}=\frac{1}{2}\left[\left(t_{22}-t_{15}\right)-\left(t_{13}-t_{21}\right)\right]$. Port 2 then uses the offset value to correct its clock.

When the CONFIRMATION message is received by all ports, all the clocks are synchronized to the reference clock. Each port will also maintain a list of all ports that have been discovered in the discovery phase in the order that they have sent their DISCOVERY messages successfully and their corresponding amounts of traffic to be sent in the upcoming first scheduling cycle. With this list, each port can then make a schedule for all ports to decide when it can send its own traffic and how much it can send. With the assumption that all ports use the same scheduling algorithm, it is easy to see that the scheduling result generated locally by each port is globally identical to guarantee that there will be no burst collisions with other ports during the first scheduling cycle. If the CONFIRMATION message is not received, a port will reboot again.

Discovery Phase During Normal Operations

Once data transfer starts, each data transfer phase is followed immediately by a discovery phase. During each discovery phase, existing ports do not send DISCOVERY messages because they are known to each other. They will listen and record information from any DISCOVERY message generated by a potential new port. When a new port tries to join the POXN, it needs to wait for the CONFIRMATION message to learn all the existing ports that are sharing the channel, to obtain the size of the next discovery window, and to know the number of scheduling cycles in the current data transfer phase to further identify the start time of the next discovery phase. This means that a new port has to wait for at least one data transfer phase before getting itself known by the other nodes. During the waiting period, it monitors the network, records information from all messages it received, and tracks the scheduling cycles to compute the precise start time for the next discovery window.

During the next discovery phase, only the new ports need to send DISCOVERY messages. This will minimize the collisions. After the discovery window ends, a CONFIRMATION message will be sent by the first successful port at system boot, or more precisely, the current clock-reference port if possible port failures are considered. The CONFIRMATION message contains information on all existing and newly joined ports, the subsequent data transfer phase, and the next discovery phase. All ports will use this information to plan their future operation events. If a CONFIRMATION message is not received, a port will deem that the clock-reference port happen to fail during the discovery phase, and then reboot. However, such failure events should be very rare judging the small durations of discovery phases as shown later.

Data Transfer Phase

A scheduling algorithm will decide when a port can send and how much it can send. We do not add conditions on what scheduling algorithms can be used as long as all ports follow the same scheduling algorithm. In FIG. 6, as an example, we assume the scheduling algorithm used decides that the order to send data traffic is Port 2, Port 3, Port 1 in the first scheduling cycle. The data transfer phase then starts with Port 2 sending its own data burst at time t23=tC1−TL2/2 to arrive at the coupler fabric precisely at time tC1 as defined in the CONFIRMATION message. After finishing its data burst, it will advertise its loopback time tL2 and its request for the next scheduling cycle as piggyback through a REQUEST message. All other ports will record the loopback time and the requested amount in their lists for the next cycle calculation. Port 3 follows Port 2 to send. Port 3 will schedule its traffic burst in such a way that it arrives at the coupler fabric right after the last bit of the piggyback information sent by Port 2. Port 3 can do so because it knows its propagation time to the coupler fabric (i.e., TL3/2). If clocks are not perfect even after correction, a guard time may be necessary to avoid overlaps. After Port 3 finishes its burst, it will advertise its loopback time and request for the next cycle as Port 2. All other ports will record.

This process will continue until the last port finishes its data burst and piggyback request. When the REQUEST message from the last port is received by all the ports, each port knows the loopback times of all ports and requests of all ports in the second scheduling cycle. Assume that in the second cycle, the transmission order given by the scheduling algorithm is the same as that in the first cycle. Port 2 then starts the next cycle immediately. Ideally, the first bit from Port 2 should arrive at the coupler fabric right after the last bit of the last cycle. However, one challenge is that Port 2 may not have received the piggyback request sent by the last few ports because it needs to send its burst earlier to reduce the gap caused by the propagation delay. Without the piggyback request of the last few ports, it only has partial request information to calculate its schedule for the next cycle. Under this situation, Port 2 may need to wait until the piggyback requests from all the ports are received, as shown in FIG. 6. The start time of the second cycle tC3 is computed locally by each port as tC3=tC2+½ max {TL1, TL2, TL3}+Tproc+TL2/2, where tC2 denotes the time when the last bit of the last cycle arrives at the coupler fabric, ½ max {TL1, TL2, TL3} is the time for this last bit to propagate from the coupler fabric to the farthest port, Tproc is a constant time value set for message processing, algorithm running, etc. at a port, and TL2/2 is the propagation time for the first bit of the first transmission port in the current cycle (i.e., Port 2) to arrive at the coupler fabric. Note that tC2 is given in the previous cycle as the output of the scheduling algorithm.

The start times of subsequent scheduling cycles are determined similarly one after another. Consequently, by listening to the channel starting from a CONFIRMATION message, timing of all channel access events can be accurately computed throughout the whole data transfer phase. This allows an unknown new port to identify the discovery window, which immediately follows the reception of the last bit of a data transfer phase. The channel-idle gap between cycles can be eliminated by developing more sophisticated scheduling algorithm, which we leave for future research.

At time t15 when the CONFIRMATION message is transmitted, Port 1 only knows its own loopback time. To allow the data transfer phase to start with any port, Port 1 assumes that the farthest port is 10 km from/to the coupler fabric. Let TCPMAX=50 □s denote the corresponding one-way propagation time. Time tC1 is thus computed as tC1=t15+tCFMtrans+tL1/2+2 TCPMAX+Tproc, where tCFMtrans denotes the message transmission time. Also, since each port knows the loopback times of all the ports at the end of the first scheduling cycle, the transmission order among the ports can change from cycle to cycle thereafter. It is easy to see that the above protocol can support QoS because we have not added any special requirements on the scheduling algorithm as long as all the ports use the same deterministic scheduling algorithm. This makes our algorithm simple and very attractive for different applications.

When a port dies, other ports will detect this because the dead port will not send its request for the next cycle any more. All other ports do not need to do anything other than schedule their future cycles assuming the dead port do not have anything to send. If the dead port is the clock-reference port, all other ports still behave the same way until the next discovery phase. During the next discovery phase, all other ports will remove the failed port from their lists. The second port on the list then becomes the clock-reference port.

Power Efficiency

When a port is not sending data, it turns off its transmitters to avoid interfering with other ports' transmissions. This also helps with the energy saving purpose. Moreover, when a port has less data to send during the non-rush hours, it can simply shut down some of its transmitters completely as if the port "dies" on the corresponding wavelengths. This property further reduces energy, and is well supported when the protocol is implemented on a per-wavelength basis. When the traffic demands increase, these transmitters can be powered up again by taking the opportunities of periodic discovery phases.

Bandwidth Efficiency

In the following, we use a numerical example to show the bandwidth efficiency of our proposed protocol. The parameters we use are based on existing EPON technology, as given in Table 1 below. A coupler fabric to interconnect 64 ports has been assumed. Initially we consider the bandwidth overhead caused by the entire discovery phase. It is assumed that the discovery phase is triggered every 1 minute. The discovery window is considered to be 500 µs, among which 100 µs is for message propagation, and 400 µs is for random back-off. It should be noted that messages can only have collisions within the coupler fabric. Because both message transmission time and propagation delay within the coupler fabric are very small, the chance that two or more frames will have a collision is actually very small. The discovery phase is concluded by the transmission of a CONFIRMATION message, which takes 100 µs to reach the farthest port. Thus, the overhead for the discovery phase is estimated as [(500+100)×10-6]/60×100%=0.001%, which has negligible effect on bandwidth efficiency, and thus is not taken into account. In other words, bandwidth efficiency is fully determined by the data transfer phase. We assume a simple scheduling algorithm that does not eliminate channel-idle gaps between scheduling cycles, as shown in FIGS. 6 and 7. The channel-idle gap is composed of propagation delay from the coupler fabric to the farthest port, a constant processing time Tproc within each port, and propagation delay from the first transmission port of the next cycle to the coupler fabric. Each propagation delay, in the worst case, is $T_{MAX}^{CP}$=50 µs. Consequently, the bandwidth efficiency of our proposed protocol is approximated as $[1-(10\times10^{-9}+50\times10^{-6}\times2+2000\times10^{-9}\times63)/10^{-3}]\times100\%=77.4\%$. Accordingly, each port can have an average burst size of $2.72\times10^5$ bytes per scheduling cycle, or equivalently, an average transmission rate of 2.18 Gb/s. If only one port has data to send, the maximum burst size available to the port is $1.74\times10^7$ bytes, corresponding to an instantaneous transmission rate of 139.3 Gb/s. It would be evident that the bandwidth efficiency can be further improved by using advanced scheduling algorithms that can narrow down the channel-idle gaps between scheduling cycles.

Protocol

An example of the protocol is presented below:
Define L be an ordered list
Define R be the amount of traffic to be sent at current time
Define Mac be the Mac address of the port
Define T_Wait be the initial waiting time
Define T_Discovery as the discovery window size
Define N_Scheduling be the number of scheduling cycles between two discovery phases
Define T_First as the time gap between the sending time of CONFIRMATION packet and the time that the first bit of the data transfer packet arriving at the coupler fabric
Function getclock returns current local clock time
Function receive returns a frame or a burst of frames received
Function send sends a frame or a burst of frames
Function create creates a frame
Function settimeout set a timeout event
Initialize status=New
Initialize discovery_count=1

```
1:      while getclock < T_Wait do
2:          packet=receive( )
3:          If packet=Confirmation_Packet then goto 40
4:      end while
5:      discovery_count=0
6:      if status=New && discovery_count=0 then
7:          while channel-busy do listening
8:          end while
9:          discovery_packet=create (Mac, Timestamp=getclock,
            T_Discovery, R)
10:         set a random delay
11:         send (discovery_packet)
12:     end if
13:     packet=receive( )
14:     if packet is corrupted goto 6
15:     end if
16:     if packet is redundant then
17:         drop packet
18:         goto 13
19:     end if
20:     if packet=discovery_packet then
21:         loopback_time=clock-packet.timestamp
22:         status=Old
23:     end if
24:     if packet is the first received then
25:         settimeout (packet.T_Discovery) and goto 29 when timeout
26:         first_port=packet.Mac
27:     end if
28:     insert packet info into L
29:     goto 13
30:     if Mac=first_port then
31:         Confirmation_Packet = create(L, T_first, N_Schedule)
32:         send(Confirmation_Packet)
33:     end if
34:     else
35:         packet=receive ( )
36:         If packet=Conirmation_Packet
37:             clock_error=((getclock-packet.timestamp)-
                (packet.Mac.receive_
                time-packet.Mac.timestamp))/2
38:             roundtrip_time=((getclock-packet.timestamp)+(packet.Mac.
                receive_time-packet.Mac.timestamp))/2
39:     end else
40:     count=N_Schedule
41:     While count!=0 do
42:         count--
43:         settimeout (schedule (L, T_first)) goto 47 when timeout
44:         packet=receive( )
45:         insert packet info into L
46:         goto 44
47:         if discovery_count=0 then send (burst, R)
48:     end while
49:     discovery_count=0
50:     goto 6
```

TABLE 1

Summary Table of HEDAP Protocol

| Operation Period | Time |
|---|---|
| Discovery Window | 500 μs |
| Scheduling Cycle | 1 ms |
| Inter-Port Guard Interval | 2000 ns |
| Processing Time $T_{PROC}$ | 10 ns |
| $T_{MAX}^{CP}$ worst-case propagation delay from a port to the coupler fabric, and from the coupler fabric to a port | 50 μs |

The exemplary protocol outlined above, which is one of several protocols that can provide the required novel network function for the nodes connected to a POXN. As discussed each node would transmit and receive data which would be processed with a protocol engine of a node executing the protocol and forming part of the overall processing performed by the node using one or more microprocessors.

Passive Optical Cross-Connects Based Distributed Optical Switch:

Within the preceding section a protocol is presented with respect to exploiting a passive optical cross-connect as the basis of a optical network for connecting N nodes with low latency to a POXN with 2N×2N ports wherein N ports of the POXN receive CWDM (or DWDM) signals from the N nodes and N ports coupled the distributed CWDM (or DWDM) signals from the POXN to the N ports. Within this portion of the specification the inventors present a Distributed Optical Switch base on a POXN. We refer to this as a scheduled 1 TnR design for Optical Cross-Connect (OXC) transmitters/receivers (TxRx) and outline below how the resulting POXN Distributed Optical Switch (POXDOS) is the equivalent of a non-blocking switch.

Figure 8:
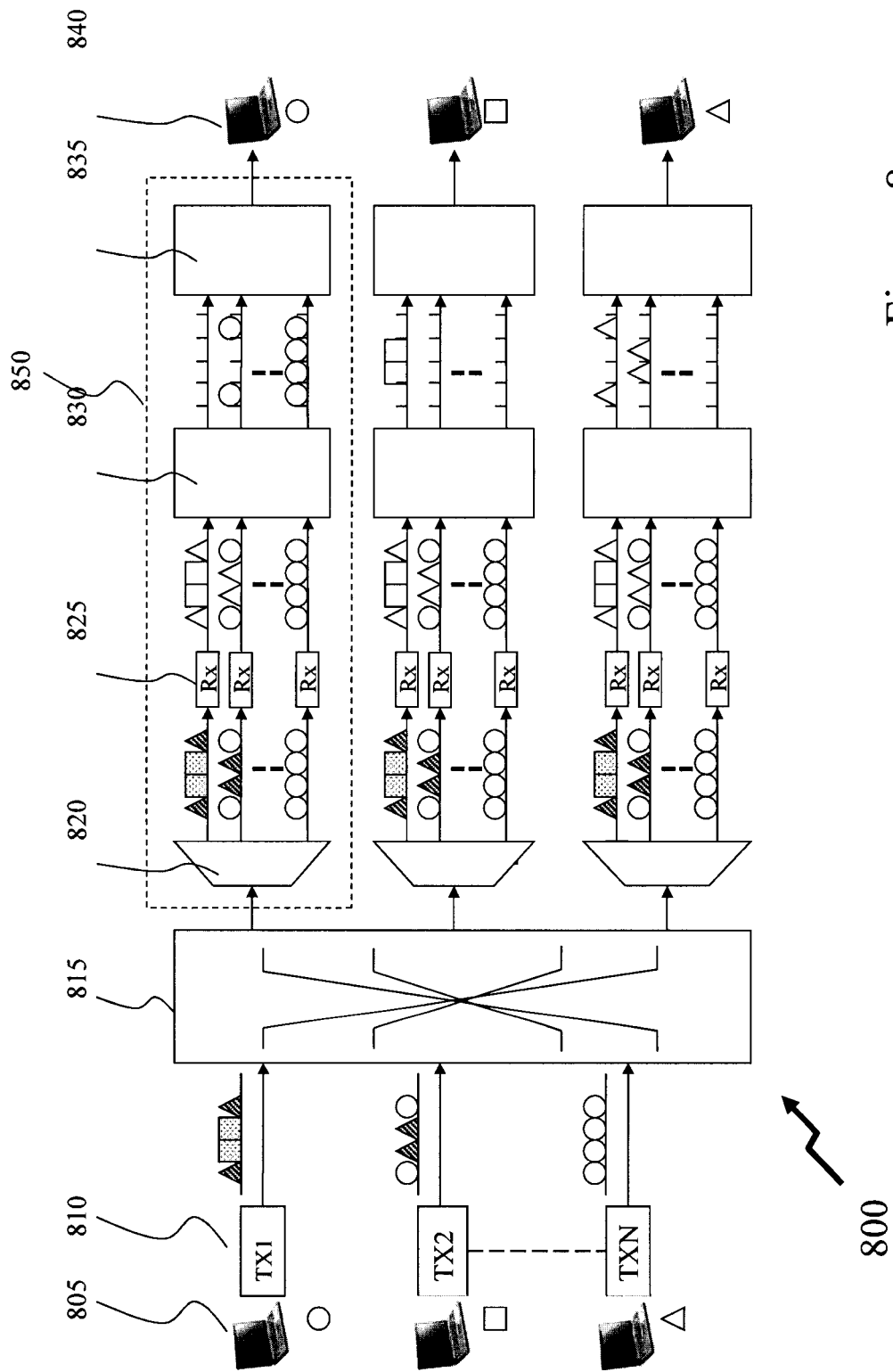
FIG. 8 depicts a passive optical cross-connect network according to an embodiment of the invention.

Within a 1TnR implementation of POXDOS 800, with reference to FIG. 8, all transmitters (Tx) 810 can work simultaneously transmitting data from their respectively connected data sources 805 because each Tx 810 operates on a different wavelength (WL). Each receiver 850 needs to receive all WLs at the optical layer, but can process only one full speed WL (from only one Tx). This limits the peak receiving bit rate to 1WL bit rate. As such, it demands only 1WL bit rate for receiving digital which the inventors state is the equivalent of a switch because all ports can work simultaneously. Accordingly, each Tx 810 is coupled to a port of the POXN 815 and each receiver 850 is coupled to another port of the POXN 815 wherein the output of each receiver 850 couples to data sink 840.

Within each receiver 850 a WDM 820 demultiplexes the N wavelengths from the N Tx 810 and couples the demultiplexed WLs to an array of optical receivers 825. The outputs of the optical receivers 825 are then coupled to a first electronic processing unit 830 wherein for each channel the first electronic processing unit 830 allows only data packets intended for the data sink 840 to progress to the second electronic processing unit 835 which sequences these allowed packets to the data sink 840 removing conflicts from packets sent simultaneously on different WLs. Accordingly, each receiver 850 may receive simultaneously data from multiple transmitters.

It would be evident to one skilled in the art that a destination address conflict may be implemented such that at anytime, for one special Rx port, only one Tx is allowed to send full speed traffic package to it. Additionally, a protocol addressing destination address conflict may also establish the selection/locking the electronic receiver 850 to the optical receiver array. Accordingly, switch intelligence and control may be distributed in embodiments of the invention.

In some embodiments of the invention all ports may work in a manner such as 1T1R in conjunction with a scheduling protocol such as described above to exchange traffic control information. Accordingly, lower speed traffic comparing with the data traffic allows all receivers to listen to the status message of other ports when it is idle and leverages the broadcasting nature of POXN. Accordingly, the receiver is locked in the optical/digital domain from the protocol and the POXDOS operates at high speed/full speed. After the transportation sequence is complete the receiving port switches back to idle mode and broadcasts its idle status. Whilst one port is exchanging with another, the other ports can establish the other links but not the one to the occupied Rx ports until after its release.

Accordingly, one port with associated Tx/Rx can receive from one port but send to another port simultaneously and thereby provides for expanded traffic control using the scheduling method protocol. According to another embodiment of the invention all N receivers may operate simultaneously to deliver $N \times WL_{BITRATE}$ receiving speed thereby leveraging the full POXN capabilities. However, this also requires that each receiver support a digital processing capacity equivalent to $N \times WL_{BITRATE}$ which is expensive and may be selectively provided on some POXDOS implementations.

Figure 9:
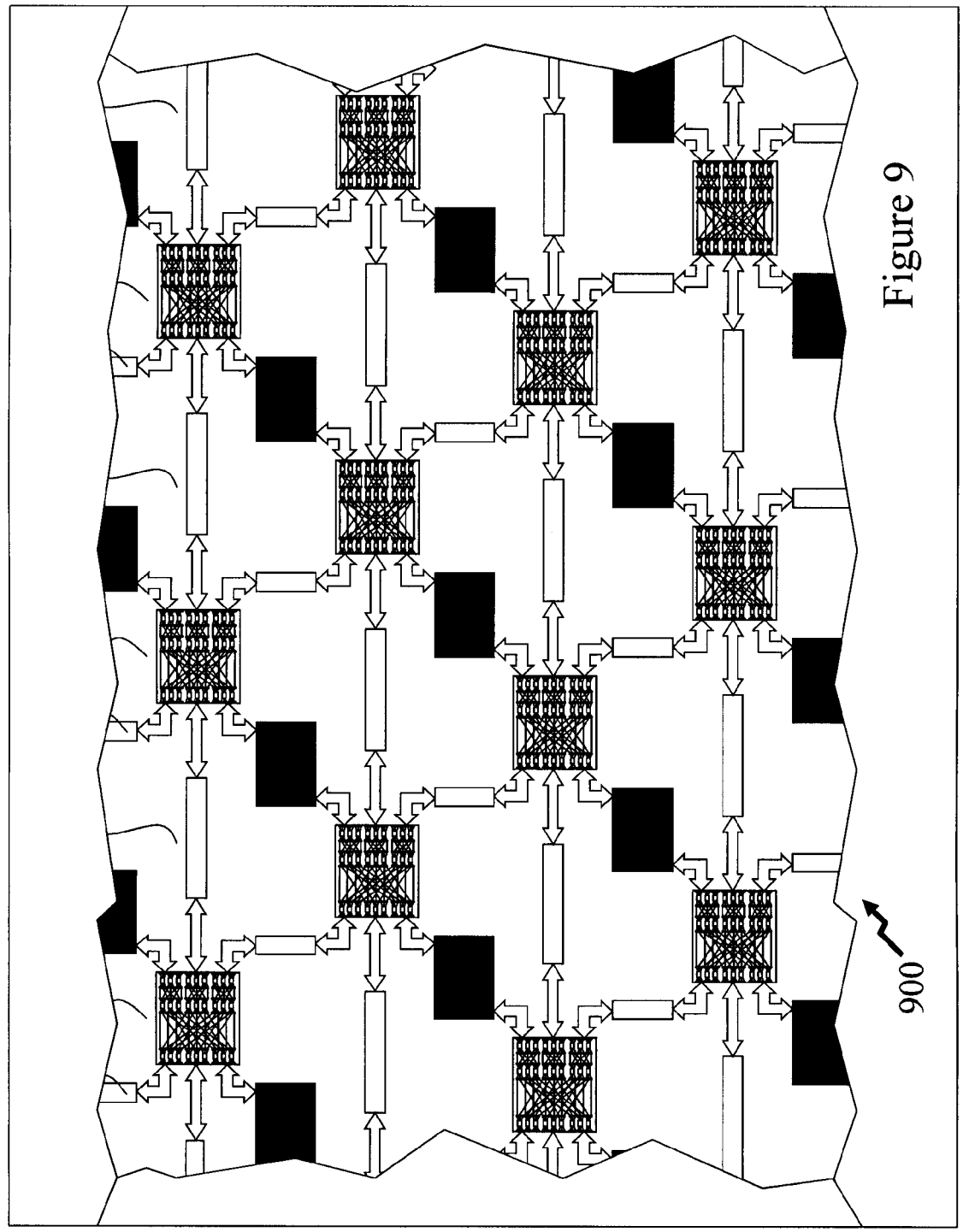
FIG. 9 depicts a passive optical cross-connect network according to an embodiment of the invention deployed within a two-dimensional Hyper POXN.

FIG. 9 depicts a passive optical cross-connect network (POXN) according to an embodiment of the invention deployed within a two-dimensional Hyper POXN (2D Hyper POXN) 900. Accordingly, as depicted the 2D Hyper POXN 900 is composed of functional units 920 which are coupled via POXNs 910 to vertical routes 930, horizontal routes 940, and a functional unit 920 within the next vertical row of functional units 920. Via a vertical route 930 a functional unit 920 is also connected to an adjacent functional unit 920 in the same horizontal row. Via a horizontal route 940 a data centre is also connected to a functional unit 920 within a next-but-one functional unit 920 within the next vertical row of functional units 920. Accordingly data extracted from a functional unit 920 may be routed to other functional units 920 or to one of the horizontal/vertical routes 940 and 930 respectively and therein distributed across the 2D Hyper POXN 900. Edge elements within 2D Hyper POXN 900, not shown for clarity, connect externally as well as internally to elements within the 2D Hyper POXN 900.

Figure 10:
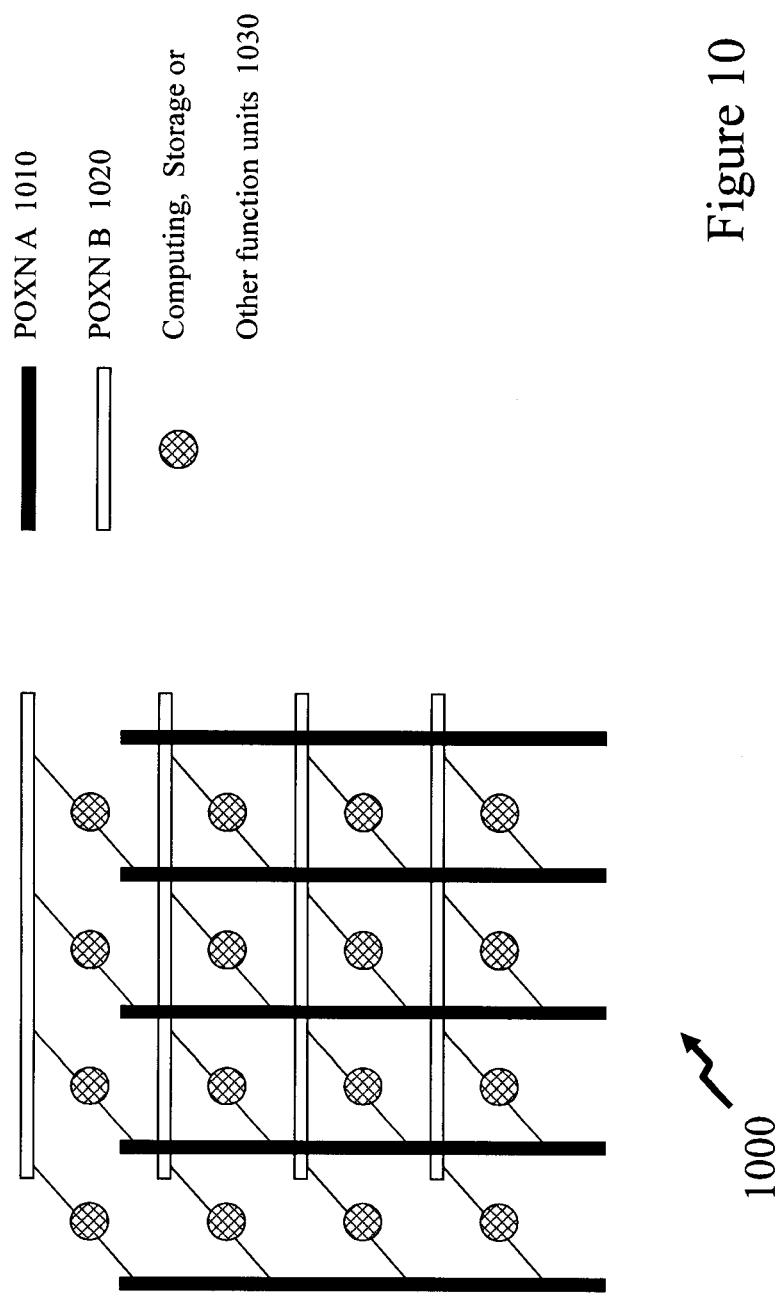
FIG. 10 depicts a passive optical cross-connect network according to an embodiment of the invention deployed within a two-dimensional Hyper POXN.

FIG. 10 depicts a passive optical cross-connect network (POXN) according to an embodiment of the invention deployed within a two-dimensional Hyper POXN (2D Hyper POXN) 1000. It would be evident to one skilled in the art that a POXN as described above may be considered to be either a linear bus equivalent with simultaneous provisioning of a signal to all nodes upon the linear bus or an optical cross-connect with "one-to-many" and "one-to-one" switching functionality. Accordingly, within FIG. 10 and 2D Hyper POXN 1000 POXNs may be depicted as linear bus elements, namely POXN A 1010 and POXN B 1020, wherein a connection from a functional unit 1030 to a POXN is a connection from the functional unit 1030 to a port of the POXN. Accordingly, as depicted in FIG. 10 and 2D Hyper POXN 1000 each functional unit 1030 is connected to two POXNs, namely POXN A 1010 and POXN B 1020 respectively. Accordingly, it would also be evident to one skilled in the art that one or both POXNs may be replaced with a Passive Optical Cross-Connect (POXC) fabric such as described above in respect of FIG. 5.

Figure 11:
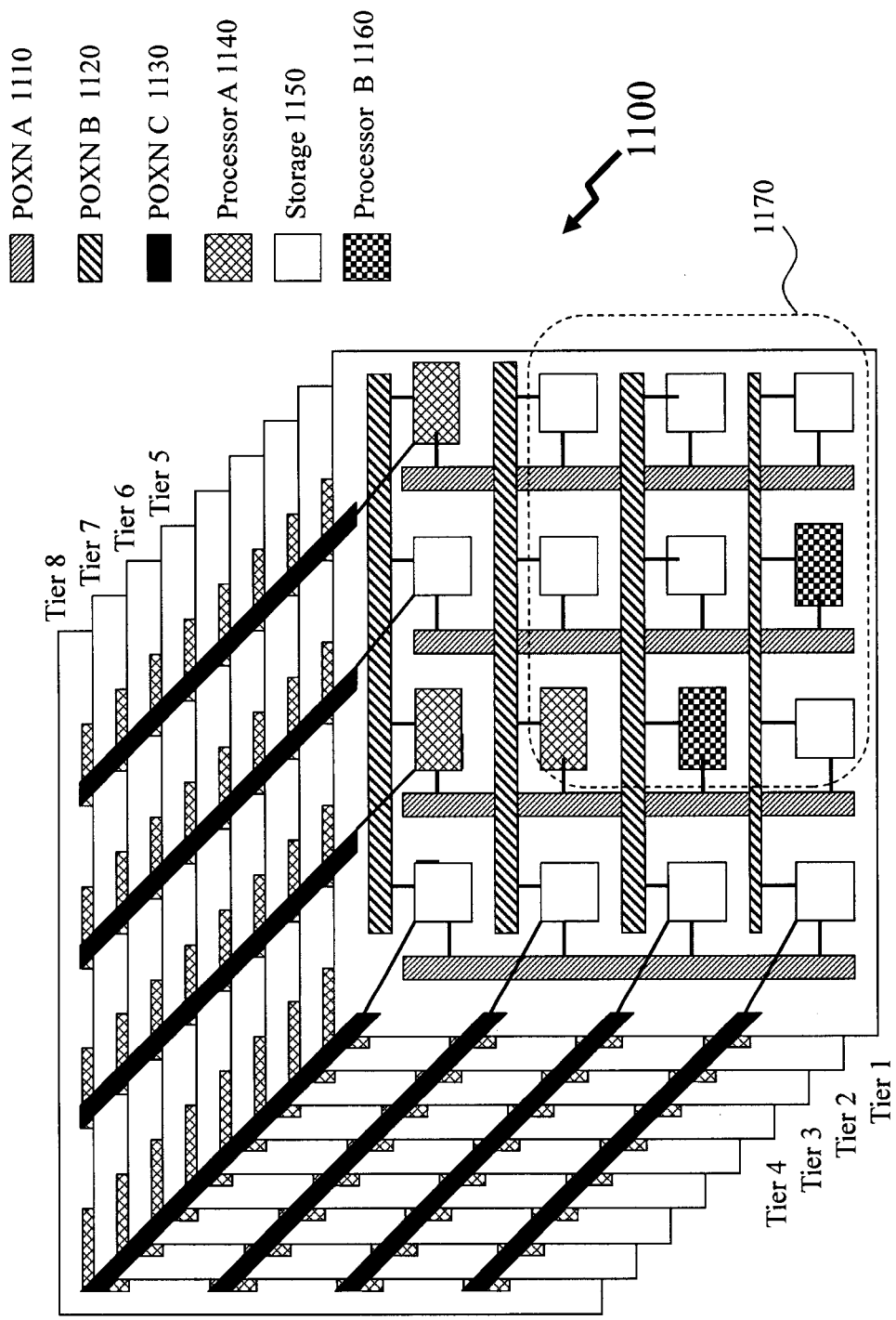
FIG. 11 depicts a passive optical cross-connect network according to an embodiment of the invention deployed within a three-dimensional Hyper POXN.

Referring to FIG. 11 there is depicted a passive optical cross-connect network (POXN) according to an embodiment of the invention deployed within a three-dimensional Hyper POXN (3D Hyper POXN) 1100. As with FIG. 10 it would be evident to one skilled in the art that a POXN may be considered a linear bus with simultaneous provisioning of a signal to all nodes upon the linear bus. Accordingly, within FIG. 11 and 3D Hyper POXN 1100 POXNs may be depicted as linear bus elements, namely POXN A 1110, POXN B 1120, and POXN C 1130. A connection from a functional unit, for example Processor A 1140, Storage 1150, or Processor B 1160, to a POXN is physically a connection from the functional unit to a port of the POXN depicted by a linear bus representation of the POXN. Accordingly, as depicted in FIG. 11 and 3D Hyper POXN 1100 each functional unit within the 3D Hyper POXN 1100 is depicted as connected to two POXNs, namely POXN A 1110 and POXN B 1120 respectively whilst those functional units on the upper and left rows within the 3D Hyper POXN 1100 are also connected to POXN C 1130 such that these are connected to three POXNs, namely POXN A 1110, POXN B 1120, and POXN C 1130 respectively. As such POXN C 1130 acts to couple between tiers of functional units which are connected via a 2D Hyper POXN such as depicted by 2D Hyper POXN 1000 in FIG. 10. These tiers being identified as Tier 1 through Tier 8 within 3D Hyper POXN 1100. Those functional elements within boundary 1170 are depicted as only being connected to two POXNs. Optionally, these functional units may also be connected to the third POXN C 1170 or may be connected to other POXNs.

Accordingly, it would also be evident to one skilled in the art that one, two, or all three POXNs may be replaced with a Passive Optical Cross-Connect (POXC) fabric such as described above in respect of FIG. 5. It would also be evident to one skilled in the art that these concepts may be extended to a generalized N-dimension mesh (NDMESH) wherein each functional unit is connected to POXNs and/or POXCs in varying combinations. 2D Hyper POXN 1000 and 3D Hyper POXN 1100 form discrete embodiments of what the inventors term as a "Hyper Optical Cloud" (HOC).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
    a plurality of distribution stages, each stage comprising a predetermined number of passive optical splitters comprising input ports and output ports which couple optical signals at each of the input ports to all of the output ports simultaneously; and
    a plurality of interconnection stages, each interconnection stage connecting a first predetermined stage of the plurality of stages to a second predetermined stage of the plurality of stages such that a predetermined portion of the optical signals from the outputs of a first predetermined number of passive optical splitters of the first predetermined stage of the plurality of stages are coupled to a predetermined portion of the inputs of a second predetermined number of passive optical splitters of the second predetermined stage of the plurality of stages in a predetermined manner; wherein
    the device either comprises:
        at least one optical splitter having three input ports and three output ports; or
        the device comprises a predetermined number of first optical splitters having three input ports and three output ports and second optical splitters having two input ports and two output ports.

2. A system comprising:
    a passive optical cross-connection network (POXN) comprising a first plurality of input ports and a second plurality of output ports;

a plurality of nodes coupled to the POXN such that signals transmitted from a node of the plurality of nodes are distributed automatically to the plurality of nodes absent any switching function;

a protocol engine in execution upon each node, the protocol engine executing a periodically repeating process of a single node discovery sequence and at least one data transfer sequence;

wherein the transmitted data from each node during the at least one data transfer sequence is determined in dependence upon the number of nodes requesting during the node discovery sequence to transmit data and the amount of data each node requesting to transmit has to transmit.

3. The system according to claim 2 wherein, the POXN comprises:
   a plurality of distribution stages, each stage comprising a predetermined number of passive optical splitters comprising input ports and output ports which couple optical signals at each of the input ports to all of the output ports simultaneously; and
   a plurality of interconnection stages, each interconnection stage connecting a first predetermined stage of the plurality of stages to a second predetermined stage of the plurality of stages such that a predetermined portion of the optical signals from the outputs of a first predetermined number of passive optical splitters of the first predetermined stage of the plurality of stages are coupled to a predetermined portion of the inputs of a second predetermined number of passive optical splitters of the second predetermined stage of the plurality of stages in a predetermined manner.

4. The system according to claim 3 wherein; wherein the POXN comprises at least one optical splitter having three input ports and three output ports.

5. The system according to claim 3 wherein, wherein the POXN comprises a predetermined number of first optical splitters having three input ports and three output ports and second optical splitters having two input ports and two output ports.

6. The system according to claim 2 wherein, the latency of received data transmitted by a first node of the plurality of nodes at an input port of the POXN to all output ports of the POXN is constant within a predetermined amount.

7. A system comprising
a passive optical cross-connection network (POXN) comprising a first plurality of input ports and a second plurality of output ports;
a plurality of transmitter nodes coupled to the POXN such that signals transmitted from a transmitter node of the transmitter plurality of nodes are distributed automatically to a plurality of receiver nodes absent any switching function, each transmitter node transmitting on a predetermined wavelength;
the plurality of receiver nodes coupled to the POXN such that signals transmitted from the plurality of transmitter nodes are distributed automatically to the plurality of receiver nodes absent any switching function, each receiver node receiving the signals from all transmitting transmitter nodes of the plurality of transmitter nodes;
a plurality of electronic processing elements receiving the plurality of received signals from the plurality of transmitter nodes, each electronic processing element filtering from each received signal of the plurality of received signals all content not intended for the receiver node of the plurality of receiver nodes of which the electronic processing element is associated; and
providing a plurality of buffers, each buffer receiving the filtered received signals from the plurality of transmitter nodes and sequencing the filtered received signals for transmission to a data sink connected to the buffer.

8. The system according to claim 7 further comprising;
a protocol engine in execution upon each of the plurality of transmitter nodes and the plurality of receiver nodes, each protocol engine executing a periodically repeating process of a single node discovery sequence and at least one data transfer sequence;
wherein the transmitted data from each transmitter node during the at least one data transfer sequence is determined in dependence upon the number of nodes requesting during the node discovery sequence to transmit data and the amount of data each node requesting to transmit has to transmit.

9. A system comprising:
a first passive optical cross-connection network (POXN) comprising a first plurality of first input ports and a second plurality of first output ports;
a second passive optical cross-connection network (POXN) comprising a first plurality of second input ports and a second plurality of second output ports; and
a plurality of data sources, each data source coupled to a predetermined first input of the first plurality of first input ports, a predetermined first output of the first plurality of first output ports, a predetermined second input of the second plurality of second input ports, a predetermined second output of the second plurality of second output ports.

10. The system according to claim 9 wherein, at least one POXN further comprises:
   the plurality of receiver nodes coupled to the POXN such that signals transmitted from the plurality of transmitter nodes are distributed automatically to the plurality of receiver nodes absent any switching function, each receiver node receiving the signals from all transmitting transmitter nodes of the plurality of transmitter nodes;
   a plurality of electronic processing elements receiving the plurality of received signals from the plurality of transmitter nodes, each electronic processing element filtering from each received signal of the plurality of received signals all content not intended for the receiver node of the plurality of receiver nodes of which the electronic processing element is associated; and
   a plurality of buffers, each buffer receiving the filtered received signals from the plurality of transmitter nodes and sequencing the filtered received signals for transmission to a data sink connected to the buffer.

11. A system comprising:
a plurality N of passive optical cross-connection networks (POXN), each POXN comprising a plurality of input ports and a plurality of output ports; and
a plurality of data sources, each data source coupled to a predetermined input of each POXN of the plurality of POXNs and to a predetermined output of each POXN of the plurality of POXNs.

12. The system according to claim 11 wherein,
at least one POXN further comprises:
- the plurality of receiver nodes coupled to the POXN such that signals transmitted from the plurality of transmitter nodes are distributed automatically to the plurality of receiver nodes absent any switching function, each receiver node receiving the signals from all transmitting transmitter nodes of the plurality of transmitter nodes;
- a plurality of electronic processing elements receiving the plurality of received signals from the plurality of transmitter nodes, each electronic processing element filtering from each received signal of the plurality of received signals all content not intended for the receiver node of the plurality of receiver nodes of which the electronic processing element is associated; and
- a plurality of buffers, each buffer receiving the filtered received signals from the plurality of transmitter nodes and sequencing the filtered received signals for transmission to a data sink connected to the buffer.

* * * * *